(12) United States Patent
Wang et al.

(10) Patent No.: US 12,472,458 B2
(45) Date of Patent: Nov. 18, 2025

(54) AIR SEPARATION PROCESSES USING ZEOLITE ITQ-55

(71) Applicant: ExxonMobil Technology and Engineering Company, Annandale, NJ (US)

(72) Inventors: Yu Wang, Lebanon, NJ (US); Edward W. Corcoran, Jr., Nazareth, PA (US); Pavel Kortunov, Flemington, NJ (US); Avelino Corma Canos, Valencia (ES)

(73) Assignee: EXXONMOBIL TECHNOLOGY AND ENGINEERING COMPANY, Spring, TX (US)

( * ) Notice: Subject to any disclaimer, the term of this patent is extended or adjusted under 35 U.S.C. 154(b) by 516 days.

(21) Appl. No.: 17/814,931

(22) Filed: Jul. 26, 2022

(65) Prior Publication Data
US 2023/0182066 A1      Jun. 15, 2023

Related U.S. Application Data

(60) Provisional application No. 63/265,230, filed on Dec. 10, 2021.

(51) Int. Cl.
*B01D 53/047*     (2006.01)
*B01D 53/04*      (2006.01)
*B01D 53/26*      (2006.01)

(52) U.S. Cl.
CPC ..... *B01D 53/0473* (2013.01); *B01D 53/0423* (2013.01); *B01D 2253/108* (2013.01);
(Continued)

(58) Field of Classification Search
CPC .. B01D 53/0473; B01D 53/04; B01D 53/047; B01D 53/0423; B01D 2253/108;
(Continued)

(56) References Cited

U.S. PATENT DOCUMENTS 4,194,892 A * 3/1980 Jones ................. B01D 53/0473
                                                 95/143
4,964,888 A * 10/1990 Miller ................. B01D 53/047
                                                 95/143
(Continued)

FOREIGN PATENT DOCUMENTS

| EP | 3 613 492 A1 | 2/2020 |
| WO | 2015/196026 A1 | 12/2015 |
| WO | 2019/183635 A1 | 9/2019 |

OTHER PUBLICATIONS

Reyes, S. C., et al., "Frequency Modulation Methods for Diffusion and Adsorption Measurements in Porous Solids", J. Phys. Chem. B., vol. 101, pp. 614-622 (1997).
(Continued)

*Primary Examiner* — Frank M Lawrence, Jr.
(74) *Attorney, Agent, or Firm* — Shook, Hardy & Bacon L.L.P.

(57) ABSTRACT

This disclosure relates to the adsorption and separation of fluid components, such as oxygen, in a feed stream, such as air, using zeolite ITQ-55 as the adsorbent. A process is disclosed for adsorbing oxygen from a feed stream containing oxygen, nitrogen and argon. The process comprises passing the feed stream through a bed of an adsorbent comprising zeolite ITQ-55 to adsorb oxygen from the feed stream, carrying out an equalization step to improve recovery, thereby producing a nitrogen product stream depleted in oxygen as well as a waste stream can be collected to have enriched oxygen. The feed stream is exposed to the zeolite ITQ-55 at effective conditions for performing a rapid cycle of kinetic separation, in which oxygen exhibits greater kinetic selectivity than nitrogen and argon.

14 Claims, 23 Drawing Sheets

(52) U.S. Cl.
CPC .. *B01D 2253/304* (2013.01); *B01D 2253/342* (2013.01); *B01D 2257/104* (2013.01); *B01D 2257/80* (2013.01); *B01D 2259/402* (2013.01)

(58) Field of Classification Search
CPC ........ B01D 2253/304; B01D 2253/342; B01D 2257/104; B01D 2257/80; B01D 2259/402; B01D 53/261; B01D 2256/10; B01D 2257/11; B01D 2258/06; B01D 2259/40035; B01D 2259/40037; B01D 2259/40066; B01D 53/0476; B01D 53/002
USPC ..................................... 95/96, 117, 138, 148
See application file for complete search history.

(56) References Cited

U.S. PATENT DOCUMENTS

| | | | |
|---|---|---|---|
| 5,354,346 | A | 10/1994 | Kumar |
| 6,500,234 | B1* | 12/2002 | Ackley ................. B01D 53/02 95/902 |
| 6,607,584 | B2 | 8/2003 | Moreau et al. |
| 7,049,259 | B1 | 5/2006 | Deckman et al. |
| 7,094,275 | B2 | 8/2006 | Keefer et al. |
| 2002/0112606 | A1* | 8/2002 | Ackley .............. B01D 53/0473 95/96 |
| 2003/0221555 | A1 | 12/2003 | Golden et al. |
| 2006/0169142 | A1 | 8/2006 | Rode et al. |
| 2007/0095208 | A1* | 5/2007 | Baksh ................ B01D 53/0476 95/96 |
| 2008/0282885 | A1 | 11/2008 | Deckman et al. |
| 2012/0190900 | A1* | 7/2012 | Weston .................... B01J 20/18 502/64 |
| 2012/0222553 | A1 | 9/2012 | Kamakoti et al. |
| 2012/0222554 | A1 | 9/2012 | Leta et al. |
| 2013/0036905 | A1 | 2/2013 | Lively et al. |
| 2014/0157984 | A1 | 6/2014 | Deckman et al. |
| 2015/0336043 | A1 | 11/2015 | Sadasivan Vijayakumari |
| 2016/0008753 | A1 | 1/2016 | Corcoran, Jr. et al. |
| 2016/0008754 | A1 | 1/2016 | Corcoran, Jr. et al. |
| 2016/0008756 | A1 | 1/2016 | Corcoran, Jr. et al. |
| 2016/0009563 | A1 | 1/2016 | Corma Canos et al. |
| 2016/0009618 | A1* | 1/2016 | Corcoran, Jr. ..... B01D 53/0462 |
| 2016/0095663 | A1 | 4/2016 | Richart |
| 2016/0207025 | A1* | 7/2016 | Laroche ............. B01J 20/28061 |
| 2018/0215618 | A1* | 8/2018 | Kang ........................ C01B 3/48 |
| 2019/0091651 | A1 | 3/2019 | Bhadra et al. |
| 2020/0054987 | A1* | 2/2020 | Bhadra .............. B01D 53/0446 |

OTHER PUBLICATIONS

International Search Report and Written Opinion received for PCT Application No. PCT/US2022/074136, mailed on Dec. 12, 2022, 16 pages.

Majumdar, B., et al., "Adsorption and Diffusion of Methane and Nitrogen in Barium Exchanged ETS-4", Industrial & Engineering Chemistry Research (Ind. Eng. Chem. Res.), American Chemical Society, vol. 50, pp. 3021-3034 (Jan. 25, 2011).

Weh, R., et al., "Nitrogen Rejection by Dual Reflux Pressure Swing Adsorption Using Engelhard Titanosilicate Type 4", Industrial & Engineering Chemistry Research (Ind. Eng. Chem. Res.), American Chemical Society, vol. 59, pp. 22573-22581 (Dec. 15, 2020).

Wang, Y., et al., "New frequency response method for measuring adsorption rates via pressure modulation: Application to oxygen and nitrogen in a carbon molecular sieve", Ind. Eng. Chem. Res., vol. 42, pp. 4213-4222 (2003).

International Search Report and Written Opinion received for PCT Application No. PCT/US2022/074134, mailed on Jan. 4, 2023, 16 pages.

International Search Report and Written Opinion received for PCT Application No. PCT/US2022/074131, mailed on Jan. 4, 2023, 17 pages.

Non-Final office action received for U.S. Appl. No. 17/814,953, mailed on Dec. 12, 2023, 18 pages.

Amiri et al. "Experimental, Kinetic, and Isothermal Modeling of Carbon Dioxide Adsorption with 13X Zeolite in a Fixed Bed Column", Iranian Journal of Chemical Engineering, vol. 16, No. 1, Winter 2019, 16 pages.

Final Office Action received for U.S. Appl. No. 17/814,953, mailed on Jul. 18, 2024, 18 pages.

Non-Final Office Action received for U.S. Appl. No. 17/814,953, mailed on Mar. 20, 2025, 21 pages.

Non-Final Office Action received for U.S. Appl. No. 17/814,969, mailed on Feb. 25, 2025, 23 pages.

Final Office Action received for U.S. Appl. No. 17/814,969, mailed on Sep. 2, 2025, 27 pages.

* cited by examiner

Fig. 1
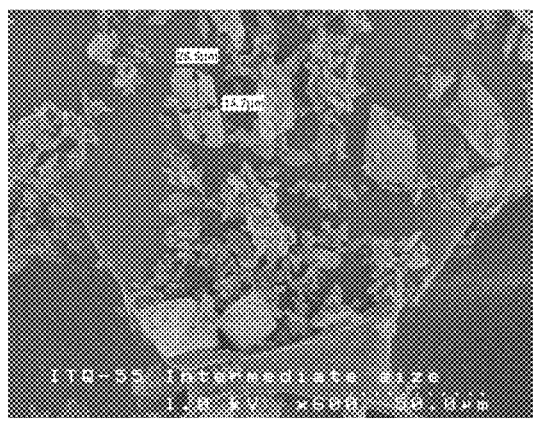
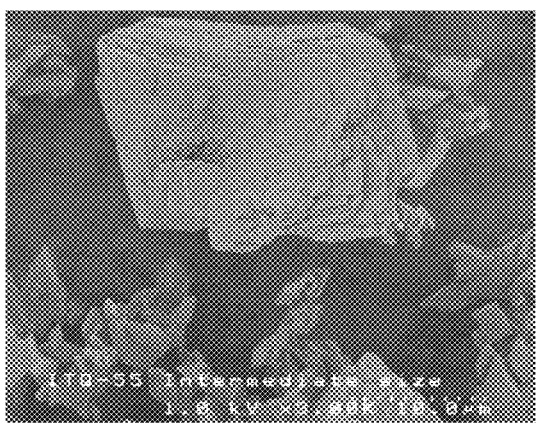

| T (°C) | P (bar) | N₂ kinetics (min) | P (bar) | O₂ kinetics (min) | Kinetic selectivity |
|---|---|---|---|---|---|
| 25 | 0.9→1 | 1.41 | 0.9→1 | ~1 | ~2 |
| 0 | 0.9→1 | 7.8 | 0.9→1 | ~1 | ~8 |
| -25 | 0.7→1 | 19.4 | 0.3→0.7 | ~1 | ~20 |
| -50 | 0.7→1 | 63* | 0.3→0.7 | Still fast | ~60 |
| -100 | 0→1 | 777* | 0.3→0.7 | Relatively fast | ~700 |

Experiment did not reach equilibrium for $N_2$ at -50 and -100 °C.

Fig. 14
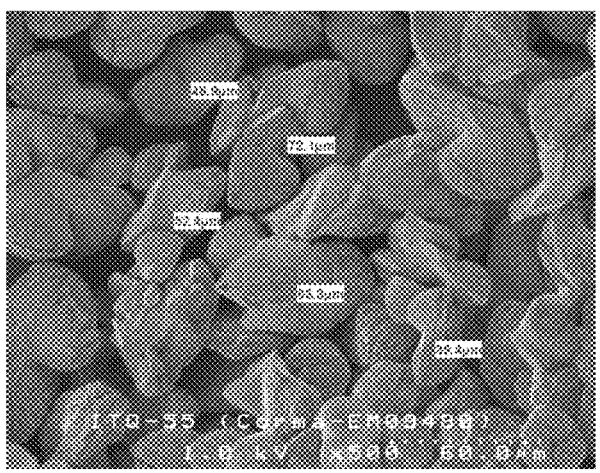
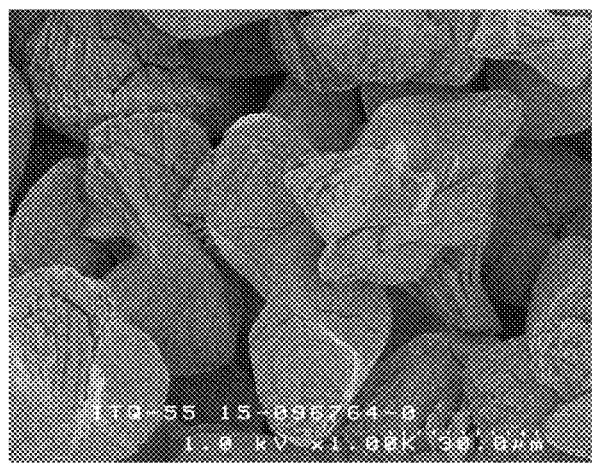

| Vacuum pressure (bar) | Feed flow (sm$^3$/s) | O2 recovery (%) | N2 purity (%) | N2 recovery (%) |
|---|---|---|---|---|
| 1.013 | 23.0 | 64.3 | 89.3 | 69.2 |
| 0.75 | 19.0 | 82.9 | 94.0 | 60.8 |
| 0.5 | 18.5 | 91.1 | 96.3 | 57.3 |
| 0.25 | 18.7 | 95.5 | 97.4 | 55.6 |
| 0.1 | 18.8 | 96.9 | 97.6 | 55.1 |

Fig. 27

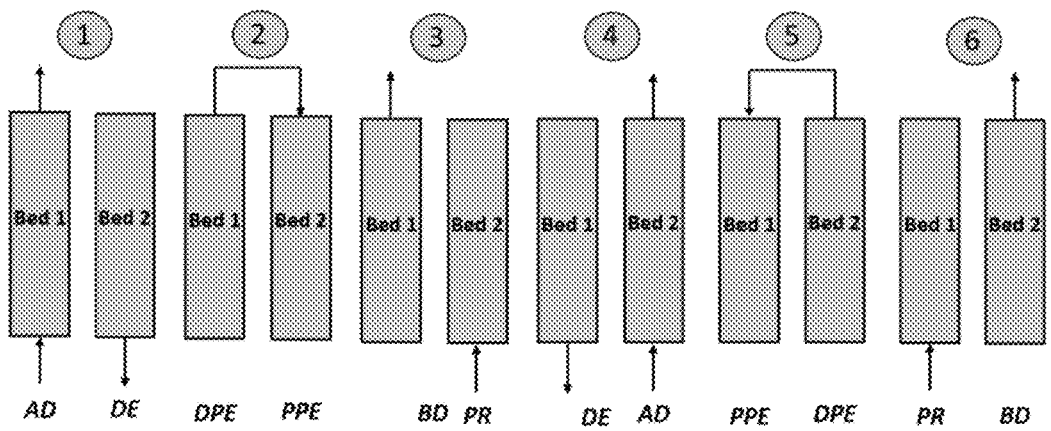

Fig. 28

| Step | Bed 1 | Bed 2 |
| --- | --- | --- |
| 1 | AD – co-current adsorption | DE – counter-current desorption under vacuum |
| 2 | DPE – De-pressurize equivalization with Bed 2 from bed top | PPE – Re-pressurize equivalization with Bed 1 from bed top |
| 3 | BD – co-current blowdown to atmospheric pressure | PR – co-current feed pressurization |
| 4 | DE – counter-current desorption under vacuum | AD – co-current adsorption |
| 5 | PPE – Re-pressurize equivalization with Bed 2 from bed top | DPE – De-pressurize equivalization with Bed 1 from bed top |
| 6 | PR – co-current feed pressurization | BD – co-current blowdown to atmospheric pressure |

| Adsorbent | Enriched Oxygen product | | | Nitrogen product | | |
|---|---|---|---|---|---|---|
| | $O_2$ purity (%) | $O_2$ recovery (%) | Productivity (T/D/$m^3$ bed) | $N_2$ purity (%) | $N_2$ recovery (%) | Productivity (T/D/$m^3$ bed) |
| ITQ-55 | 40.16 | 97.64 | 3.84 | 99.22 | 41.41 | 2.35 |
| CMS | 40.13 | 90.82 | 2.88 | 97.98 | 40.94 | 1.89 |

Fig. 31

| Step | Bed 1 | Bed 2 |
|---|---|---|
| 1-1 | AD – co-current adsorption | DE – counter-current purge using half of total BD effluent gases |
| 1-2 | | DE – counter-current purge using a ratio of AD effluent gases |
| 2 | DPE – De-pressurize equivalization with Bed 2 from bed top | PPE – Re-pressurize equivalization with Bed 1 from bed top |
| 3 | BD – co-current blowdown to atmospheric pressure | PR – co-current feed pressurization |
| 4-1 | DE – counter-current purge using half of total BD effluent gases | AD – co-current adsorption |
| 4-2 | DE – counter-current purge using a ratio of AD effluent gases | |
| 5 | PPE – Re-pressurize equivalization with Bed 2 from bed top | DPE – De-pressurize equivalization with Bed 1 from bed top |
| 6 | PR – co-current feed pressurization | BD – co-current blowdown to atmospheric pressure |

Fig. 32

| Adsorbent | Enriched Oxygen product | | | Nitrogen product | | |
|---|---|---|---|---|---|---|
| | $O_2$ purity (%) | $O_2$ recovery (%) | Flow (ton/day) | $N_2$ purity (%) | $N_2$ recovery (%) | Flow (ton/day) |
| ITQ-55 | 30.18 | 97.13 | 29.95 | 98.03 | 36.91 | 12.67 |
| CMS | 30.16 | 90.65 | 27.58 | 95.13 | 40.81 | 14.29 |

AIR SEPARATION PROCESSES USING ZEOLITE ITQ-55

CROSS REFERENCE TO RELATED APPLICATIONS

This application claims priority to and the benefit of U.S. Ser. No. 63/265,230 filed on Dec. 10, 2021, the entire contents of which are incorporated herein by reference.

This invention also relates to U.S. Ser. No. 63/265,232 filed Dec. 10, 2021 and U.S. Ser. No. 63/265,234 filed Dec. 10, 2021.

FIELD

This disclosure relates to the kinetic separation of fluid components, such as oxygen, in an oxygen containing stream, such as air, using zeolite ITQ-55 as the adsorbent. The kinetic separation exhibits greater kinetic selectivity for oxygen than for nitrogen and/or argon with tunable cycle time via control of crystal sizes and operating conditions. Optionally, a low temperature adsorption step can further decrease the technology footprint via increased material capacities and kinetic selectivities.

BACKGROUND

In the gas production industry, there is a need to efficiently separate oxygen from oxygen containing streams. In cryogenic air separation, nitrogen ($N_2$), oxygen ($O_2$) and argon (Ar) are separated based on their boiling points and relative volatilities.

Cryogenic processes for air separation are highly efficient, particularly for large-volume production. However, they are also very energy intensive compared to other separations technologies such as adsorption or membrane enabled processes.

Most adsorption processes are based on equilibrium separation and employ zeolites, such as types A and X zeolite, as well as LiLSX (lithium low silica X, with Si/Al=1). The challenge for equilibrium-based separations for air and argon is limited by relatively low selectivity (less than 10), arising from the nearly equal polarizabilities of $N_2$, $O_2$, and Ar.

Carbon molecular sieves (CMS) or zeolite 4A can be used for nitrogen generation from air. These processes rely on kinetic adsorption/separation, where kinetic selectivity (diffusivity ratios) for $O_2/N_2$ is approximately 10-30, due primarily to differences in the molecular size of oxygen and nitrogen.

CMSs have been developed that selectively adsorb $O_2$ over $N_2$ based on the smaller kinetic diameter of the $O_2$ molecule. More recently, CMSs have been proposed for removal of $O_2$ from Ar by kinetic separation. CMSs are a well-known adsorbent for kinetic air separation. However, CMSs have a drawback for the purification of crude $N_2$ or Ar, including the potential for combustion if CMS dust is returned to the cryogenic distillation tower, and low recovery due to variable pore size distribution.

Zeolites are porous aluminosilicates, which are non-combustible, more stable towards oxygen exposure than CMSs, and contain well-controlled pore sizes based on their highly crystalline structure. Thus, they have the potential to overcome many of the drawbacks of CMSs. However, only a few zeolite materials have been reported for the kinetic separation of $O_2$ from $N_2$ or Ar at ambient temperatures. These include zeolite 4A, Ba exchanged titanosilicate, BaRPZ-3, zeolite CHA, and zeolite RHO.

Therefore, there is a need for the development of improved porous solid sorbents to effectively conduct the kinetic separation of oxygen from nitrogen, in particular, to enable high capacity removal of oxygen from air using kinetically selective zeolite adsorbents.

SUMMARY

This disclosure relates to a process of adsorbing oxygen from a feed stream containing oxygen and nitrogen. The process comprises passing the feed stream through a bed of an adsorbent comprising zeolite ITQ-55 to adsorb oxygen from the feed stream, thereby producing a product stream depleted in oxygen. The zeolite ITQ-55 has a mean crystal particle size within the range of from about 0.1 microns to about 40 microns. The feed stream is exposed to the zeolite ITQ-55 at effective conditions for performing a kinetic separation, in which the kinetic separation exhibits greater kinetic selectivity for oxygen than for nitrogen, as well as tunable working capacities based on selected operating temperatures and pressures. Kinetic selectivity and mass transfer rates can be tuned by varying the mean crystal particle size of zeolite ITQ-55 within the range of from about 0.1 microns to about 40 microns, or by varying the adsorption temperature within the range from about −195° C. to about 30° C., or by varying the adsorption pressure within the range from about 1 bar (~14.7 psi) to about 30 bar (~435 psi), or combinations thereof.

This disclosure relates in part to a method for separating fluids. The method comprises: exposing an input fluid stream comprising a first fluid component and a second fluid component to an adsorbent comprising zeolite ITQ-55 to form a rejection product fluid stream, a molar ratio of the first fluid component to the second fluid component in the rejection product fluid stream being less than a molar ratio of the first fluid component to the second fluid component in the input fluid stream; collecting the rejection product fluid stream; forming an adsorbed product fluid stream (e.g., by carrying out an equalization and/or depressurization step), a molar ratio of the first fluid component to the second fluid component in the adsorbed product stream being greater than the molar ratio of the first fluid component to the second fluid component in the input fluid stream; and collecting the adsorbed product fluid stream. The zeolite ITQ-55 has a mean crystal particle size within the range of from about 0.1 microns to about 40 microns. The input fluid stream is exposed to the zeolite ITQ-55 at effective conditions for performing a kinetic separation, in which the kinetic separation exhibits greater kinetic selectivity for the first fluid component than for the second fluid component, as well as tunable working capacities based on selected operating temperatures and pressures. Kinetic selectivity and mass transfer rates can be tuned by varying the mean crystal particle size of zeolite ITQ-55 within the range of from about 0.1 microns to about 40 microns, or by varying the adsorption temperature within the range from about −195° C. to about 30° C., or by varying the adsorption pressure within the range from about 1 bar (~14.7 psi) to about 30 bar (~435 psi), or combinations thereof.

This disclosure also relates in part to a process of adsorbing oxygen from a feed stream containing oxygen, nitrogen and argon. The process comprises passing the feed stream through a bed of an adsorbent comprising zeolite ITQ-55 to adsorb oxygen from the feed stream, thereby producing a product stream depleted in oxygen. The zeolite ITQ-55 has a mean crystal particle size within the range of from about 0.1 microns to about 40 microns. The feed stream is exposed to the zeolite ITQ-55 at effective conditions for performing a kinetic separation, in which the kinetic separation exhibits greater kinetic selectivity for oxygen than for nitrogen and argon, as well as tunable working capacities based on selected operating temperatures and pressures.

This disclosure further relates in part to a process of adsorbing oxygen from a feed stream containing oxygen and argon. The process comprises passing the feed stream through a bed of an adsorbent comprising zeolite ITQ-55 to adsorb oxygen from the feed stream, thereby producing a product stream depleted in oxygen. The zeolite ITQ-55 has a mean crystal particle size within the range of from about 0.1 microns to about 40 microns. The feed stream is exposed to the zeolite ITQ-55 at effective conditions for performing a kinetic separation, in which the kinetic separation exhibits greater kinetic selectivity for oxygen than for argon, as well as tunable working capacities based on selected operating temperatures and pressures.

This disclosure yet further relates in part to a process of adsorbing oxygen from a feed stream comprising oxygen, nitrogen, and water. The process comprises passing the feed stream through one or more beds of adsorbent comprising a first adsorbent selective for water so as to adsorb water from the feed stream and a second adsorbent selective for oxygen so as to adsorb oxygen from the feed stream, thereby producing a rejection product stream enriched in nitrogen and depleted in oxygen and water. The first bed comprises a dehydration adsorbent and the second bed comprises zeolite ITQ-55. The zeolite ITQ-55 has a mean crystal particle size within the range of from about 0.1 microns to about 40 microns. The feed stream is exposed to the first adsorbent at effective conditions to remove water from the feed stream. The feed stream is exposed to the second adsorbent at effective conditions for performing a kinetic separation, in which the kinetic separation exhibits greater kinetic selectivity for oxygen than for nitrogen. The kinetic selectivity can be tuned by varying the mean crystal particle size of zeolite ITQ-55 within the range of from about 0.1 microns to about 40 microns, or by varying the adsorption temperature within the range from about −195° C. to about 30° C., or by varying the adsorption pressure within the range from about 1 bar (~14.7 psi) to about 30 bar (~435 psi), or combinations thereof.

It has been surprisingly found that, in accordance with this disclosure, zeolite ITQ-55 offers an advantage for kinetic separations over existing processes with CMSs from the tunable kinetics with crystals size. The dominating mass transfer resistance for ITQ-55 is micropore diffusion for both $N_2$ and $O_2$. This is different from the CMSs, where the surface barrier is the more dominated at the external surface of pellets. For micropore diffusion in ITQ-55, the mass transfer rate (D/r2) can be tuned via crystal size. In contrast, there is not much to play with pellet size to tune kinetics when using CMSs. This is very important especially when low-temperature separations are employed to improve capacities and kinetic selectivity, and prohibitively slow kinetics at lower temperatures. Therefore, utilizing smaller ITQ-55 crystals to increase kinetics (to reach equilibrium), while at the same time to taking advantage of higher capacities and kinetic selectivity, can result in increased throughputs with improved purities and recoveries. The separation can be optimized by tuning a mean crystal particle size within the range of from about 0.1 microns to about 40 microns. In particular, when a feed stream (e.g., air) is exposed to the zeolite ITQ-55 at effective conditions for performing a kinetic separation, the kinetic separation exhibits greater kinetic selectivity for oxygen than for nitrogen, at a temperature from about −195° C. to about 30° C.

It has also been surprisingly found that, in accordance with this disclosure, kinetic selectivity discriminating between oxygen and nitrogen can be tuned by varying the mean crystal particle size of zeolite ITQ-55 within the range of from about 0.1 microns to about 40 microns, or by varying the adsorption temperature within the range from about −195° C. to about 30° C., or by varying the adsorption pressure within the range from about 1 bar (~14.7 psi) to about 30 bar (~435 psi), or combinations thereof.

It has further been surprisingly found that, in accordance with this disclosure, kinetic selectivity discriminating between oxygen and argon can be tuned by varying the mean crystal particle size of zeolite ITQ-55 within the range of from about 0.1 microns to about 40 microns, or by varying the adsorption temperature within the range from about −195° C. to about 30° C., or by varying the adsorption pressure within the range from about 1 bar (~14.7 psi) to about 30 bar (~435 psi), or combinations thereof.

It has yet further been surprisingly found that, in accordance with this disclosure, a new $O_2$ enrichment process can be achieved for parallel producing pure $N_2$ and enriched $O_2$ over 30 or 40% purity using ITQ-55. The enriched $O_2$ collected from the waste stream can be used as the air source for eliminating or reducing $N_2$ in traditional combustion processes (natural-gas turbine, coal-fired furnaces or biomass, etc.), to have advantages of simplifying subsequent gas purification and enables efficient $CO_2$ capture.

Other objects and advantages of the present disclosure will become apparent from the detailed description that follows.

BRIEF DESCRIPTION OF THE DRAWINGS

FIG. 1 shows scanning electron microscope (SEM) images of zeolite LTQ-55 (medium size) having a crystal size distribution of 2-30 microns.

In FIG. 6, MFC=Mass Flow Controller, PT=pressure transducer, MFM=mass flow meter, and PC=pressure controller.

FIG. 14 shows scanning electron microscope (SEM) images of zeolite ITQ-55 (large size) having a mean crystal size distribution of about 60 microns.

FIG. 27 shows a 6-step vacuum pressure swing adsorption (VPSA) cycle, in accordance with the Examples.

FIG. 28 shows an operation sequence for two adsorption beds, in accordance with the Examples.

FIG. 31 shows the operation sequence for two adsorption beds, in accordance with the Examples.

FIG. 32 shows a comparison of separation performances for ITQ-55 and carbon molecular sieves (CMSs) including purity, recovery and productivity, in accordance with the Examples.

DETAILED DESCRIPTION

Figure 2:
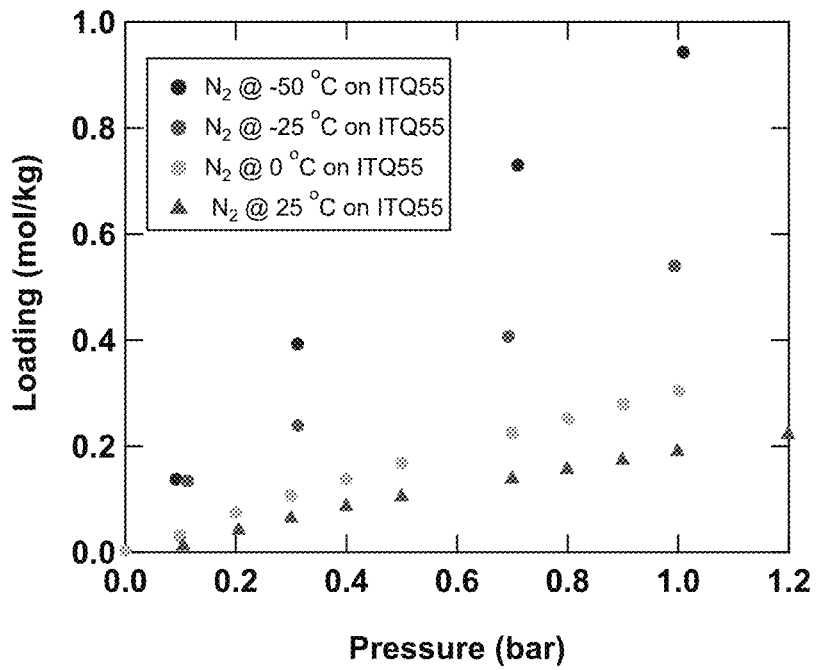
FIG. 2 graphically shows an equilibrium isotherm for $N_2$ on zeolite ITQ-55 at −50° C., −25° C., 0° C., and 25° C., in accordance with the Examples.

In accordance with this disclosure, highly effective kinetic separations for $O_2(Ar)/N_2$ are provided, beyond CMS or zeolite 4A, by utilizing a small pore zeolite, ITQ-55. Surprisingly, the kinetic selectivity for this material (ITQ-55) is further enhanced by running the separation at sub-ambient or even sub-zero temperatures. An additional advantage for lower temperature operation is the resulting increased equilibrium capacities, enabling smaller bed sizes. Further process intensification can be realized through rapid-cycle operations with a structured material.

An advantage afforded by ITQ-55 for kinetic separations over existing processes arises from the optimization of cycle times. The dominating mass transfer resistance for ITQ-55 is micropore diffusion for both $N_2$ and $O_2$. This is different from the CMSs, where the surface barrier is the controlling resistance for $N_2$ adsorption. For micropore diffusion in ITQ-55, the mass transfer rate (D/r2) can be tuned via crystal size with constant D. For process optimization, this value is important as cycle time depends on the kinetics, which links to the mass transfer rate.

For CMS, the surface barrier is controlled by the pore opening at the surface for $N_2$, in turn, adjusting pellet size may not be an efficient way to tune kinetics as demonstrated in literature, for example, see Y. Wang, B. K. Sward, M. D. LeVan, New frequency response method for measuring adsorption rates via pressure modulation: Application to oxygen and nitrogen in a carbon molecular sieve, Ind. Eng. Chem. Res. 42 (2003) 4213-4222. It was shown that for commercial Takeda CMS MSC-3K type 161, the mass-transfer rate of $O_2$ is much faster than that of $N_2$, and dominated by the barrier resistance that exists at the surface of CMS followed by a micropore diffusion with the CMS. The mass transfer of $N_2$ is more controlled by surface barrier. To determine whether the particle diameter impacts the mass-transfer rate, experiments were compared with original CMS sample and reduced particle size having an average particle diameter of one-fifth of the original one. The same mass-transfer coefficients of $O_2$ were obtained for both small and large particle sizes of CMS, but mass-transfer coefficients of $N_2$ decreased slightly with increasing particle sizes. Therefore, the degree of tuning mass transfer rates when using CMS is limited, especially when low-temperature separations are employed to improve capacities and kinetic selectivity, and prohibitively slow kinetics arise and dominate at lower temperatures. Therefore, utilizing smaller ITQ-55 crystals to increase kinetics (to reach equilibrium), while at the same time to taking advantage of higher capacities and kinetic selectivity, can result in increased throughputs for air separation, with improved purities and recoveries. This cannot be achieved with commercial CMS for such operation.

In accordance with this disclosure, a new $O_2$ enrichment process is provided by parallel producing pure $N_2$ and enriched $O_2$ using ITQ-55. Air separation by adsorption approach to enable oxygen enrichment is desirable for a variety of applications. Eliminating or reducing $N_2$ in traditional combustion processes (natural-gas turbine, coal-fired furnaces or biomass, etc.) simplifies subsequent gas purification and enables efficient $CO_2$ capture. For existing technologies that rely on the cryogenic distillation of air, air separation units (ASUs) comprise nearly 30% of the capital costs for a gasification facility, largely due to compression and chilling.

It is possible to use liquid air energy storage integrated with liquefied natural gas (LNG) regasification plants to make use of waste cold in the air liquefaction process. The waste cold in LNG import terminals is significant due to large-volume LNG storage. LNG is normally regasified by heating with seawater and burning some natural gas. This leads to wasting of cold contained in the LNG and the burned natural gas. If liquid air energy storage (LAES) were colocated at the LNG terminal, and air rather than seawater was used to provide heat for the LNG regasification process, the resulting cold air could then be fed into the air liquefier, potentially reducing its electricity consumption by as much as two-thirds. Low temperature PSA air separation can be an alternative or in hybrid mode with ASU for energy efficiency or size reduction.

Oxygen-enriched combustion (OEC) can enhance the performance of steam methane reforming (SMR) by 1) reducing the fraction of parasitic nitrogen in the combustion gases, thus decreasing the amount of sensible heat escaping in the flue gases and increasing the heat available to the process, and 2) improving heat transfer to the reformer because of higher flame temperatures and higher throughput of combustion gases due to the increase in $CO_2$ and $H_2O$ concentrations. This also leads to advantages for the reforming equilibrium shifting towards higher hydrogen production.

OEC can be used for a wide variety of performance and business objectives. For example, OEC can be highly advantaged if used to reduce fuel consumption at constant hydrogen production. Also, utilizing enriched $O_2$ instead of standard air feed for cryogenic air separation can greatly reduce power consumption. Other potential $O_2$ enrichment schemes may be employed for fuel cells. For example, the fuel-cell current density might be increased by more than 50% with oxygen enrichment from 21% to 30%, from lower polarization losses at the cathode.

Other advantages afforded by this disclosure include, for example, generating product streams rich in $N_2$ for use in the production of $NH_3$, generating product steams rich in $N_2$ for use in refining petroleum, treating metals, producing fertilizer, rocket fuel, and the like.

In accordance with this disclosure, the use of ITQ-55 for an enhanced kinetic air separation achieved at sub-ambient or even sub-zero temperatures. An additional advantage for lower temperature operation is the resulting increased equilibrium capacities, enabling smaller bed size. The process can be further optimized by utilizing smaller ITQ-55 crystals to increase kinetics (to reach equilibrium), while at the same time to taking advantage of higher capacities and kinetic selectivity, can result in increased throughputs for air separation, with improved purities and recoveries.

Through advantaged cycle development, the air separations of this disclosure allow for co-production of $N_2$ streams from the adsorption step, and production of enriched $O_2$ streams, at different targeted levels, from the desorption or partial blowdown step. The separation utilizing zeolite ITQ-55 can be operated at a wide range of pressures, temperatures, and cycle times tunable via the selection of specific crystal sizes in advanced contactor schemes, allowing for highly tunable operations.

This disclosure provides a kinetic separation mechanism for air separation with ITQ-55 at sub-zero temperature ~−50° C. that consumes less energy as opposed to −200° C. for conventional cryogenic separation. The proposed kinetic separation of nitrogen and oxygen from the air provides better kinetic selectivity (~200 at −50° C.) compared to (10-30 at room temperature conventional carbon molecular sieve for air separation. Surprisingly, zeolite ITQ-55 can also kinetically separate $O_2$ and argon.

Previous work in literature and commercial application focuses on carbon molecular sieve (CMS) or 4A pellets for kinetic separation. CMSs are effective for separating oxygen from nitrogen because the rate of adsorption of oxygen is higher than that of nitrogen. It has a carbon deposition step at a moderately high temperature. Thus the surface of CMS is uniformly covered by carbon, and the pore entrances are narrowed to a dimension that lies between the kinetic diameters of $O_2$ (3.46 Å) and $N_2$ (3.64 Å) for air separation. In accordance with this disclosure, the zeolite ITQ-55 shows high kinetic selectivity or air separation, and kinetics can be tuned based on crystal size. Zeolite crystals (2-60 µm) are used to obtain accurate diffusivities from transport diffusion measurement, and results show that the mass transfer mechanism is dominated by micropore diffusion. With synthesized smaller crystals on a structured adsorption contractor, air separation processes can be achieved with rapid cycle times. This affords many advantages, specifically less weight, space, and footprint than conventional kinetic air separation using carbon molecular sieve pellets with long time cycles.

As used herein "kinetic selectivity" refers to properties shown by molecular sieve materials in which the difference in the sorption kinetics of molecules of a different size or mass is used to select one species over another. The kinetic selectivity is the ratio of diffusivities of the molecules (e.g., oxygen and nitrogen). The kinetic selectivity of zeolite ITQ-55 is exploited in swing adsorption processes for gas separation applications. In accordance with this disclosure, zeolite ITQ-55 having a mean crystal particle size within the range of from about 0.1 microns to about 40 microns, exhibits high kinetic selectivity discriminating between oxygen and nitrogen.

As used herein, "kinetic activity" refers to the rate of adsorption/desorption shown by molecular sieve materials in which the difference in the sorption kinetics of molecules of a different diffusivities, size or mass is used to select one species over another. The kinetic activity of zeolite ITQ-55 is exploited in swing adsorption processes for gas separation applications. In accordance with this disclosure, for zeolite ITQ-55 having a mean crystal particle size within the range of from about 0.1 microns to about 40 microns, the rate of oxygen uptake is faster than the rate of nitrogen uptake.

A PSA process aimed at the recovery of the lighter species in the light product stream is significantly improved if it is also designed to simultaneously enrich the heavier species in the heavy product stream. Sometimes, a higher enrichment of the heavier species in the heavy product stream leads to higher recoveries of the lighter species in the light product stream. The enrichment of the heavier species in the heavy product stream, and hence the recovery of the lighter species in the light product stream, also increases by decreasing the pressure within the bed during the PSA cycle using PSA cycle steps that are particularly designed for this purpose.

One such step is the equalization step, in which two adsorbent beds of the PSA process are connected at a given moment during the PSA cycle to equalize their own pressures to a common value. This is done sometime before the final depressurization of the bed and most commonly through the light ends of the beds. The content of the lighter species in the beds is reduced because the gas stream leaving the beds is comparably much richer in these species.

This disclosure relates to the use of a microporous crystalline material of zeolitic nature, identified as "zeolite ITQ-55", to selectively adsorb oxygen from air by kinetic separation.

Figure 33:
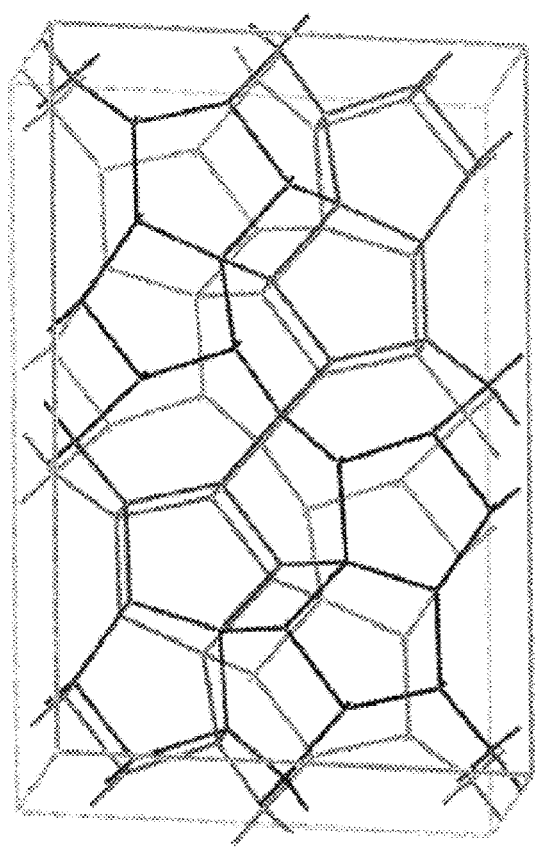
FIG. 33 represents the framework structure of ITQ-55 showing only the tetrahedral atoms.

As used herein, ITQ-55 (INSTITUTO DE TECNOLOGIA QUIMICA number 55) refers to a crystalline microporous material having a framework of tetrahedral atoms connected by bridging atoms, the tetrahedral atom framework being defined by the interconnections between the tetrahedrally coordinated atoms in its framework, as described in U.S. Patent Application Publication No. 2016/00095663, the disclosure of which is incorporated herein by reference in its entirety. ITQ-55 is stable to calcination in air. FIG. 33 represents the framework structure of ITQ-55 showing only the tetrahedral atoms.

This material, both in its calcined form and synthesized without calcining has an X-ray diffraction pattern that is different from other well-known zeolitic material and, therefore, is characteristic of this material.

In various aspects, the material is suitable for use in separations based on selective adsorption of fluid components. In various aspects, the material is suitable for use in membrane separations of fluid components. In various aspects, the material is suitable for use for storage of a fluid component.

The composition and preparation of ITQ-55 are described, for example, in U.S. Patent Application Publication Nos. 2016/0008753, 2016/0008754, 2016/0008756, 2016/0009563, and 2016/0009618, the disclosures of which are all incorporated herein by reference in their entirety.

The ITQ-55 material used in this disclosure may be pelletized in accordance with well-known techniques.

This disclosure refers to the use of the ITQ-55 microporous crystalline material for separation and adsorption applications.

For its use in separation and adsorption applications, it is preferable that ITQ-55 is in its calcined form without organic matter in its interior.

The ITQ-55 material used in adsorption/separation processes may be in its purely siliceous form, that is to say, not containing elements other than silicon and oxygen in its composition.

The ITQ-55 material used in adsorption/separation processes may be in silica-germania form, that is to say, not containing elements other than silicon, germanium and oxygen in its composition.

The ITQ-55 material is particularly appropriate for use as selective adsorbent of $O_2$ in the presence of $N_2$ or Ar and combinations of the same, in streams that contain these gases, as well as adsorbent in powdered or pelletized form or in membrane form.

According to one specific embodiment, the ITQ-55 material may be used for the separation of $O_2$ from $N_2$.

According to one specific embodiment, the ITQ-55 material may be used for the separation of $O_2$ from argon.

In an embodiment, this disclosure provides a process for adsorbing oxygen from a feed stream comprising oxygen, nitrogen, and water. The process involves passing the feed stream through one or more beds of adsorbent comprising a first adsorbent selective for oxygen so as to adsorb oxygen from the feed stream and a second adsorbent selective for water so as to adsorb water from the feed stream. The first adsorbent comprises zeolite ITQ-55 and the second adsorbent comprises a zeolite containing one or more of (i) aluminum, (ii) phosphorus, and (iii) silicon, in a skeletal structure thereof. The second adsorbent can be any conventional zeolite capable of adsorbing water, for example, zeolite 3A, 4A, 5A, 13X, and the like.

Throughout the description and the claims the word "includes" and its variants does not seek to exclude other technical characteristics, additives, components or steps. For the experts in the matter, other objects, advantages and characteristic of the disclosure shall come partly from the description and partly from the practice of the disclosure.

Separation Process and Method of Use Overview

In this discussion, a fluid is defined as a gas or a liquid, including mixtures of both gas and liquid. In this discussion, ambient temperature generally refers to a pressure of about 1 atmosphere (about 101 kPa) and a temperature of about 20° C.

In various aspects, processes are provided that implement a molecular sieve corresponding to zeolite ITQ-55 as described herein for adsorption and/or separation of components of fluid streams, such as gas streams, liquid streams, or streams corresponding to a mixture of gas and liquid. The zeolite ITQ-55 can be suitable for separating a variety of small molecules. At some temperatures, a molecular sieve corresponding to zeolite ITQ-55 can be suitable for adsorbing a variety of small molecules while reducing, minimizing, or even substantially eliminating adsorption of nitrogen. For example, zeolite ITQ-55 can be suitable for performing separations to separate $O_2$ from $N_2$, or $O_2$ from argon. A variety of other types of fluid separations can also be performed depending on the composition of an input gas and the temperature and pressure during the separation process.

The pore structure of zeolite ITQ-55 includes 8-member ring channels. The 8-member ring channels include a minimum pore channel size in the pore network of 5.9 Angstroms×2.1 Angstroms at ambient temperature. This minimum pore channel size can limit the types of compounds that can effectively enter and/or pass through the pore network. However, the 8-member ring that provides the minimum size is also believed to have flexibility. This flexibility can allow the 8-member ring to deform, such as due to thermal fluctuations and/or due to fluctuations induced at elevated pressures, which can lead to a potential temporary change in the size of the pore channel. Without being bound by any particular theory, it is believed that the flexibility of the 8-member ring defining the size of the pore channel can allow for additional tuning of separations of various compounds based on temperature and/or pressure.

Additionally or alternately, the particle size of ITQ-55 crystals used in an adsorbent structure or membrane structure can have an impact on the ability of the adsorbent structure or membrane structure to perform a separation. As one example, the particle size of the ITQ-55 crystals can have an influence on the amount of "dead space" that is present at the surface and/or within the interior of an adsorbent structure or membrane structure. Mathematically, the packing density of a collection of hard spheres of similar size is dependent on the radius of the spheres. For a collection of hard spheres, the larger the average radius, the larger the size of the spaces or gaps between the hard spheres. Without being bound by any particular theory, it is believed that for a collection of ITQ-55 crystals of similar size, the size of the voids or dead spaces created after close packing of crystals can be related to the average particle size. Having a smaller particle size can reduce such dead space, thus providing an increased pore surface area for accepting fluid components for separation.

In an embodiment, the zeolite ITQ-55 can be used in an adsorbent structure (e.g., adsorbent bed). The zeolite ITQ-55 is made up of zeolite crystal particles having a mean particle size within the range of from about 0.1 to about 40 microns. In one type of aspect, the mean zeolite crystal particle size can optionally be within the range of from about 0.1 to about 35 microns, preferably it is within the range of from about 0.1 to about 30 microns, and most preferably within the range of from about 0.5 to about 30 microns. Alternatively, the mean particle size can advantageously be such that at least 5% of the unit cells of the crystal are at the crystal surface. Optionally, the zeolite crystal particles can have a mean particle size within the range from about 0.5 to about 25 microns, or within the range from about 0.5 to about 10 microns, or within the range of from about 0.5 to about 5 microns, or within the range of from about 0.5 to about 2.5 microns, or within the range of from about 0.5 to about 2 microns.

In such an aspect, the zeolite crystal particle size distribution can be such that 95% of the particles have a size within ±33% of the mean, or 95% are within ±15% of the mean, or 95% are within ±10% of the mean, or 95% are within ±7.5% of the mean, or 95% are within ±5% of the mean, or 95% are within ±2.5% of the mean, or 95% are within ±1% of the mean, or 95% are within ±0.5% of the mean.

In some aspects, the zeolite crystal particles of ITQ-55 can be contiguous in the adsorbent bed, i.e., substantially every particle is in contact with one or more of its neighbors as evidenced by electron microscopy preferably high resolution microscopy, although not necessarily in contact with all its closest neighbors. In a preferred embodiment, the particles in the adsorbent bed are closely packed.

References to zeolite crystal particle size are throughout this specification to the longest dimension of the particle and particle sizes are as measured by direct imaging with electron microscopy. Particle size distribution may be determined by inspection of scanning or transmission electron micrograph images preferably on lattice images, and analyzing an appropriately sized population of particles for particle size.

Additionally or alternately, the composition of ITQ-55 crystals used in an adsorbent structure or membrane structure can have an impact on the ability of the adsorbent structure or the membrane structure to perform a separation. In some aspects, ITQ-55 can be synthesized to have a framework structure composed of primarily silicon and oxygen. In other aspects, a portion of the framework atoms in the ITQ-55 structure can be replaced with other elements. For example, a portion of the silicon in the framework structure can be replaced with atoms from a different group in the periodic table, such as Al, P, or B. As another example, a portion of the silicon in the framework can be replaced with atoms from a different row of the periodic table, such as Ge or P. Such composition variations can modify the size of the pores within the crystal structure and/or modify the affinity of the ITQ-55 relative to one or more potential components for adsorption. Such modifications of pore size and/or affinity can potentially improve selectivity (such as kinetic selectivity) for one or more types of separation.

Zeolite ITQ-55 can be used to separate components in a fluid stream (for example, a gas stream) in various manners. In some aspects, zeolite ITQ-55 can be used to form a membrane structure, so that separation of fluid components is performed by forming a permeate and a retentate portion of a fluid on respective sides of the membrane. Zeolite ITQ-55 can assist with such a membrane separation, for example, by having varying selectivities for allowing fluid components to pass through the membrane.

In other aspects, zeolite ITQ-55 can be used to form an adsorbent structure within a separation vessel, so that separation of fluid components can be performed by adsorbing a portion of a fluid stream within the adsorbent structure while allowing a remainder of the fluid stream to exit from the separation vessel. The adsorbent structure can be composed of the zeolite ITQ-55, or the zeolite ITQ-55 can form a coating as part of an adsorbent structure, so that molecules can pass through the pores of ITQ-55 crystals in order to enter the underlying structure. The zeolite ITQ-55 can assist with performing separations using such an adsorbent structure, for example, by having varying selectivities for allowing fluid components to enter the adsorbent structure.

In still other aspects, zeolite ITQ-55 can be used as part of a storage structure for fluids, such as a storage structure within a storage vessel. A storage structure can in some aspects be similar to an adsorbent structure. However, the storage structure can be used in a different manner, so that gases (or more generally fluids) that enter the storage structure can be retained for an extended period of time. The storage structure can be composed of the zeolite ITQ-55, or the zeolite ITQ-55 can form a coating for a storage structure, so that molecules can pass through the pores of ITQ-55 crystals in order to enter the storage structure. The zeolite ITQ-55 can assist with storage of fluid components using such a storage structure, for example, by having varying selectivities for allowing fluid components to enter the storage structure. The zeolite ITQ-55 can potentially also assist with storage of fluids using such a storage structure, for example, by having a rate of transfer through the pore network that is greater at higher temperature and lower at reduced temperatures. The difference in rate of transfer or movement within the pores of ITQ-55 can be enhanced by the flexible nature of the 8-member ring that defines the minimum pore size for ITQ-55.

The composition of ITQ-55, preparation of ITQ-55, and uses of ITQ-55, are described, for example, in U.S. Patent Publication Nos. 2016/0008753, 2016/0008754, 2016/0008756, 2016/0009563, and 2016/0009618, all of which are incorporated herein by reference in their entirety.

Separation of Fluid Components

When a fluid stream is exposed to a membrane structure, adsorbent structure, storage structure, or other porous structure that includes zeolite ITQ-55 as part of the surface of the structure, a selective separation of components within the fluid stream may occur if one or more of the components in the fluid stream has a sufficiently small kinetic diameter.

Some fluid separations can be performed based on one component of a fluid having a sufficiently small kinetic diameter to enter the pores of zeolite ITQ-55 while a second component is too large to enter the pore network under the exposure conditions. For example, it has been determined that $N_2$ is too large of a kinetic diameter to have kinetic limitation to enter and/or pass through the pore network of ITQ-55 at typical ambient conditions, such as about 20° C. and about 0.1 MPaa This is in contrast to compounds with a smaller kinetic diameter, such as $O_2$, which can enter and/or pass through the pore network with less kinetic limitation. In this type of situation, a separation can be performed with a high degree of selectivity, as the amount of $N_2$ entering an ITQ-55 layer can be substantially limited to $N_2$ that enters at a discontinuity in the ITQ-55 layer, such as a mesopore or macropore at a crystal or grain boundary.

Other types of separations can be dependent on differences in uptake by zeolite ITQ-55 between two (or more) fluid components that have sufficiently small kinetic diameters to enter and/or pass through the pore network of ITQ-55. In this situation, separation of components in an input fluid stream can be performed based on a kinetic separation or an equilibrium separation of the components. The nature of the separation can be dependent on, for example, the relative kinetic diameters of the components and/or the relative affinities of the components for the ITQ-55.

One example of a process where the relationship between the kinetic diameters and/or affinities of molecules and the size of the pore network of a zeolite can be relevant is in selective adsorption of components from a fluid stream. In equilibrium controlled adsorption processes, most of the selectivity is imparted by the equilibrium adsorption properties of the adsorbent, and the competitive adsorption isotherm of a first fluid component in the micropores or free volume of the adsorbent is not favored relative to a second component. In kinetically controlled processes, most of the selectivity is imparted by the diffusional properties of the adsorbent and the transport diffusion coefficient in the micropores and free volume of the competing adsorbed components. In some kinetically controlled processes, a component with a higher diffusivity can be preferentially adsorbed relative to a component with a lower diffusivity. Additionally or alternately, the relative affinity of competing adsorbed components for ITQ-55 can be a factor, which may alter the selectivity for separation of components relative to an expected selectivity based just on diffusivity. Also, in kinetically controlled processes with microporous adsorbents, diffusional selectivity can arise from diffusion differences in the micropores of the adsorbent and/or from selective diffusional surface resistance in the crystals or particles that make-up the adsorbent.

Unless otherwise noted, the term "adsorbent selectivity" as used herein is based on the selectivity of an adsorbent can additionally or alternatively be characterized based on a "kinetic selectivity" for two or more fluid components. As used herein, the term "kinetic selectivity" is defined as the ratio of single component diffusion coefficients, D (in $m^2/sec$), for two different species. These single component diffusion coefficients are also known as the transport diffusion coefficients that are measured for a given adsorbent for a given pure gas component. Therefore, for example, the kinetic selectivity for a particular adsorbent for component A with respect to component B would be equal to $D_A/D_B$. The single component diffusion coefficients for a material can be determined by tests well known in the adsorptive materials art. The preferred way to measure the kinetic diffusion coefficient is with a frequency response technique described by Reyes et al. in "Frequency Modulation Methods for Diffusion and Adsorption Measurements in Porous Solids", J. Phys. Chem. B. 101, pages 614-622, 1997.

In other aspects, the selectivity of an adsorbent can additionally or alternatively be characterized based on an "equilibrium selectivity" for two or more fluid components. As used herein, the term "equilibrium selectivity" is defined in terms of the slope of the single component uptake into the adsorbent (in mol/g) vs. pressure (in torr) in the linear portion, or "Henry's regime", of the uptake isotherm for a given adsorbent for a given pure component. The slope of this line is called herein the Henry's constant or "equilibrium uptake slope", or "H". The "equilibrium selectivity" is defined in terms of a binary (or pairwise) comparison of the Henrys constants of different components in the feed for a particular adsorbent. Therefore, for example, the equilibrium selectivity for a particular adsorbent for component A with respect to component B would be $H_A/H_B$.

Another example of a process where the relationship between the kinetic diameters of molecules (or atoms), affinities of molecules (or atoms) for ITQ-55, and the size of the pore network of a zeolite can be relevant is in selective separation of components from a fluid stream using a membrane. Membrane separations can primarily be performed based on the kinetic selectivity of a membrane. Unlike an adsorbent, any fluid components passing through a membrane to form a permeate can be removed periodically or continuously. For example, the permeate side of the membrane can be exposed to a sweep stream. This can prevent a substantial concentration of a component from accumulating on the permeate side of a membrane, so that transport of a fluid component of interest from the retentate side to the permeate side is enhanced or maximized.

In some aspects, it can be desirable to use zeolite ITQ-55 for adsorption and/or separation of components where the zeolite ITQ-55 can provide sufficient selectivity between components. For example, use of ITQ-55 can provide a selectivity for a first fluid component over a second fluid component, either for adsorption or for separation via membrane, of at least about 5, or at least about 10, or at least about 20, or at least about 30.

Examples of separations that can be performed (either via adsorption or membrane separation) include, but are not limited to:

a) Separation of $O_2$ from $N_2$ or air. This separation can be performed at ambient temperature or greater as a kinetic separation, or optionally at temperatures below ambient. In some aspects, the separation conditions can be in contrast to conventional methods for separation of $O_2$ from $N_2$ or air, as conventional methods often involve separation at cryogenic conditions. The separation of this disclosure can be facilitated by the kinetic separation of $O_2$ from $N_2$ and other air components, by ITQ-55 under kinetic separation conditions.

b) Separation of $O_2$ from argon. This separation can be performed at ambient temperature or greater as a kinetic separation or an equilibrium separation, or optionally at temperatures below ambient. In some aspects, the separation conditions can be in contrast to conventional methods for separation of $O_2$ from argon, as conventional methods often involve separation at cryogenic conditions. The separation of this disclosure can be facilitated by the kinetic separation of $O_2$ from argon and other air components, by ITQ-55 under kinetic separation conditions.

c) Air separations. One example is a separation of $O_2$ from $N_2$ and other air components, which can be facilitated by the kinetic separation of $O_2$ from $N_2$ and other air components, by ITQ-55 under kinetic separation conditions.

Adsorbent Separations (Including Swing Processing)

Gas separation (or other fluid separation) is important in various industries and can typically be accomplished by flowing a mixture of gases over an adsorbent that preferentially adsorbs a more readily adsorbed component relative to a less readily adsorbed component of the mixture. Swing adsorption is an example of a commercially valuable separation technique, such as pressure swing adsorption (PSA) or temperature swing adsorption (TSA). PSA processes rely on the fact that under pressure fluids tend to be adsorbed within the pore structure of a microporous adsorbent material or within the free volume of a polymeric material. The higher the pressure, the more fluid is adsorbed. When the pressure is reduced, the fluid is released, or desorbed. PSA processes can be used to separate fluids in a mixture because different fluids tend to fill the micropore or free volume of the adsorbent to different extents. If a gas mixture, such as air, for example, is passed under pressure through a vessel containing polymeric or microporous adsorbent that fills with more oxygen than it does nitrogen, part or all of the oxygen will stay in the adsorbent bed, and the non-adsorbed gas coming out of the vessel will be enriched in nitrogen. When the adsorbent bed reaches the end of its capacity to adsorb oxygen, it can be regenerated by reducing the pressure, thereby releasing the adsorbed oxygen. It is then ready for another cycle.

Another important fluid separation technique is temperature swing adsorption (TSA). TSA processes also rely on the fact that under pressure fluids tend to be adsorbed within the pore structure of a microporous adsorbent material or within the free volume of a polymeric material. When the temperature of the adsorbent is increased, the fluid is released, or desorbed. By cyclically swinging the temperature of adsorbent beds, TSA processes can be used to separate fluids in a mixture when used with an adsorbent that selectively picks up one or more of the components in the fluid mixture.

In addition to swings of pressure and/or temperature in order to form the adsorbed product stream, formation of an adsorbed product stream can be facilitated by exposing the adsorbent to a displacement fluid stream. After performing a separation by selectively adsorbing a component from an input stream, the selectively adsorbed component can be desorbed at least in part by displacing the selectively adsorbed component with another fluid component that has a greater affinity for adsorption. This additional fluid component can be referred to as a displacement fluid component. Optionally, the displacement fluid component can be readily separated from the selectively adsorbed component, such as by condensation and/or phase separation.

Adsorbents for PSA systems are usually very porous materials chosen because of their large surface area. Typical adsorbents are activated carbons, silica gels, aluminas and zeolites. In some cases a polymeric material can be used as the adsorbent material. Though the fluid adsorbed on the interior surfaces of microporous materials may consist of a layer only one, or at most a few molecules thick, surface areas of several hundred square meters per gram enable the adsorption of a significant portion of the adsorbent's weight in gas. The molecular species that selectively fill the micropores or open volume of the adsorbent are typically referred to as the "heavy" components and the molecular species that do not selectively fill the micropores or open volume of the adsorbent are usually referred to as the "light" components.

Various types swing adsorption can be used in the practice of the present disclosure. Non-limiting examples of such swing adsorption processes include thermal swing adsorption (TSA) and various types of pressure swing adsorption processes including conventional pressure swing adsorption (PSA), and partial pressure swing or displacement purge adsorption (PPSA) technologies. These swing adsorption processes can be conducted with rapid cycles, in which case they are referred to as rapid cycle thermal swing adsorption (RCTSA), rapid cycle pressure swing adsorption (RCPSA), and rapid cycle partial pressure swing or displacement purge adsorption (RCPPSA) technologies. The term swing adsorption processes shall be taken to include all of these processes (i.e., TSA, PSA, PPSA, RCTSA, RCPSA, and RCPPSA) including combinations of these processes. Such processes require efficient contact of a gas mixture with a solid adsorbent material.

Although any suitable adsorbent contactor can be used in the practice of the present disclosure, including conventional adsorbent contactors, in some aspects structured parallel channel contactors can be utilized. The structure of parallel channel contactors, including fixed surfaces on which the adsorbent or other active material is held, can provide significant benefits over previous conventional gas separation methods, such as vessels containing adsorbent beads or extruded adsorbent particles. With parallel channel contactors, total recovery of the light component (i.e., the component that is not preferentially adsorbed) achieved in a swing adsorption process can be greater than about 80 vol %, or greater than about 85 vol %, or greater than about 90 vol %, or greater than about 95 vol % of the content of the light component introduced into the process. Recovery of the light component is defined as the time averaged molar flow rate of the light component in the product stream divided by the time averaged molar flow rate of the light component in the feedstream. Similarly, recovery of the heavy component (i.e., the component that is preferentially adsorbed) is defined as the time averaged molar flow rate of the heavy component in the product stream divided by the time averaged molar flow rate of the heavy component in the feedstream.

The channels, also sometimes referred to as "flow channels", "fluid flow channels", or "gas flow channels", are paths in the contactor that allow gas or other fluids to flow through. Generally, flow channels provide for relatively low fluid resistance coupled with relatively high surface area. Flow channel length should be sufficient to provide the mass transfer zone which is at least, a function of the fluid velocity, and the surface area to channel volume ratio. The channels are preferably configured to minimize pressure drop in the channels. In many embodiments, a fluid flow fraction entering a channel at the first end of the contactor does not communicate with any other fluid fraction entering another channel at the first end until the fractions recombine after exiting at the second end. It is important that there be channel uniformity to ensure that substantially all of the channels are being fully utilized, and that the mass transfer zone is substantially equally contained. Both productivity and gas/fluid purity will suffer if there is excessive channel inconsistency. If one flow channel is larger than an adjacent flow channel, premature product break through may occur, which leads to a reduction in the purity of the product gas to unacceptable purity levels. Moreover, devices operating at cycle frequencies greater than about 50 cycles per minute (cpm) require greater flow channel uniformity and less pressure drop than those operating at lower cycles per minute. Further, if too much pressure drop occurs across the bed, then higher cycle frequencies, such as on the order of greater than 100 cpm, are not readily achieved.

The dimensions and geometric shapes of the parallel channel contactors can be any dimension or geometric shape that is suitable for use in swing adsorption process equipment. Non-limiting examples of geometric shapes include various shaped monoliths having a plurality of substantially parallel channels extending from one end of the monolith to the other; a plurality of tubular members; stacked layers of adsorbent sheets with and without spacers between each sheet; multi-layered spiral rolls, bundles of hollow fibers, as well as bundles of substantially parallel solid fibers. The adsorbent can be coated onto these geometric shapes or the shapes can, in many instances, be formed directly from the adsorbent material plus suitable binder. An example of a geometric shape formed directly from the adsorbent/binder would be the extrusion of a zeolite/polymer composite into a monolith. Another example of a geometric shape formed directly from the adsorbent would be extruded or spun hollow fibers made from a zeolite/polymer composite. An example of a geometric shape that is coated with the adsorbent would be a thin flat steel sheet that is coated with a microporous, low mesopore, adsorbent film, such as a zeolite film. The directly formed or coated adsorbent layer can be itself structured into multiple layers or the same or different adsorbent materials. Multi-layered adsorbent sheet structures are taught in U. S. Patent Application Publication No. 2006/0169142, which is incorporated herein by reference.

The dimensions of the flow channels can be computed from considerations of pressure drop along the flow channel. It is preferred that the flow channels have a channel gap from about 5 to about 1,000 microns, preferably from about 50 to about 250 microns. In some RCPSA applications, the flow channels are formed when adsorbent sheets are laminated together. Typically, adsorbent laminates for RCPSA applications have flow channel lengths from about 0.5 centimeter to about 10 meter, more typically from about 10 cm to about 1 meter and a channel gap of about 50 to about 250 microns. The channels may contain a spacer or mesh that acts as a spacer. For laminated adsorbents, spacers can be used which are structures or material, that define a separation between adsorbent laminates. Non-limiting examples of the type of spacers that can be used in the present disclosure are those comprised of dimensionally accurate: plastic, metal, glass, or carbon mesh; plastic film or metal foil; plastic, metal, glass, ceramic, or carbon fibers and threads; ceramic pillars; plastic, glass, ceramic, or metal spheres, or disks; or combinations thereof. Adsorbent laminates have been used in devices operating at PSA cycle frequencies up to at least about 150 cpm. The flow channel length may be correlated with cycle speed. At lower cycle speeds, such as from about 20 to about 40 cpm, the flow channel length can be as long as or longer than one meter, even up to about 10 meters. For cycle speeds greater than about 40 cpm, the flow channel length typically is decreased, and may vary from about 10 cm to about 1 meter. Longer flow channel lengths can be used for slower cycle PSA processes. Rapid cycle TSA processes tend to be slower than rapid cycle PSA processes and as such longer flow channel lengths can also be used with TSA processes.

In various aspects, an adsorbent contactor can contain a very low volume fraction of open mesopores and macropores. For example, an adsorbent contactor, such as a structured bed adsorbent contactor, can contain less than about 20 vol %, or less than about 15 vol %, or less than about 10 vol %, or less than about 5 vol % of their pore volume in open pores in the mesopore and macropore size range. Mesopores are defined by the IUPAC (and defined herein) to be pores with sizes in the 20 to 500 angstrom size range. Macropores are defined herein to be pores with sizes greater than about 500 Angstroms and less than about 1 micron. It is noted that flow channels within a contactor for allowing an input gas (or fluid) stream to be exposed to the contactor can typically be larger than about 1 micron in size, and therefore are not considered to be part of the macropore volume. Open pores are defined mesopores and macropores that are not occupied by a blocking agent and that are capable of being occupied, essentially non-selectively, by components of a gas mixture. Different test methods as described below can be used to measure the volume fraction of open pores in a contactor depending on the structure of the contactor.

An example of a process where an adsorbent structure comprising ITQ-55 can be used is a swing adsorption process. A swing adsorption process can include an adsorption step followed by a desorption step to recover the adsorbed component. During the adsorption step, "heavy" components are selectively adsorbed and the weakly adsorbed (i.e., "light") components pass through the bed to form the product gas. It is possible to remove two or more contaminants simultaneously but for convenience, the component or components, that are to be removed by selective adsorption will be referred to in the singular and referred to as a contaminant or heavy component. In a swing adsorption process, the gaseous mixture is passed over a first adsorption bed in a first vessel and a light component enriched product stream emerges from the bed depleted in the contaminant, or heavy component, which remains sorbed in the bed. After a predetermined time or, alternatively when a break-through of the contaminant or heavy component is observed, the flow of the gaseous mixture is switched to a second adsorption bed in a second vessel for the purification to continue. While the second bed is in adsorption service, the sorbed contaminant, or heavy component is removed from the first adsorption bed by a reduction in pressure. In some embodiments, the reduction in pressure is accompanied by a reverse flow of gas to assist in desorbing the heavy component. It also has a feature to have equalization step to minimize loss of gas and improve recovery. As the pressure in the vessels is reduced, the heavy component previously adsorbed in the bed is progressively desorbed to a heavy component enriched product stream. When desorption is complete, the sorbent bed may be purged with an inert gas stream, e.g., a purified stream of process gas. Purging may also be facilitated by the use of a purge stream that is higher in temperature than the process feedstream.

After breakthrough in the second bed and after the first bed has been regenerated so that it is again ready for adsorption service, the flow of the gaseous mixture is switched back to the first bed, and the second bed is regenerated. The total cycle time is the length of time from when the gaseous mixture is first conducted to the first bed in a first cycle to the time when the gaseous mixture is first conducted to the first bed in the immediately succeeding cycle, i.e., after a single regeneration of the first bed. The use of third, fourth, fifth, etc. vessels in addition to the second vessel can serve to increase cycle time when adsorption time is short but desorption time is long.

In some aspects, an RCPSA process can be used for separation. The total cycle times of RCPSA may be less than about 300 seconds, preferably less than about 100 seconds, more preferably less than about 30 seconds. Further, the rapid cycle pressure swing adsorption units can make use of substantially different sorbents, such as, but not limited to, structured materials such as monoliths. laminates, and hollow fibers.

The overall adsorption rate of the swing adsorption processes is characterized by the mass transfer rate from the flow channel into the adsorbent. It is desirable to have the mass transfer rate of the species being removed (i.e., the heavy component) high enough so that most of the volume of the adsorbent is utilized in the process. Since the adsorbent selectively removes the heavy component from the gas stream, inefficient use of the adsorbent layer can lower recovery of the light component and/or decrease the purity of the light product stream. With use of the adsorbent contactors described herein, it is possible to formulate an adsorbent with a low volume fraction of meso and macroporous such that most of the volume of the adsorbent, which will be in the microporous range, is efficiently used in the adsorption and desorption of the heavy component. One way of doing this is to have an adsorbent of substantially uniform thickness where the thickness of the adsorbent layer is set by the mass transfer coefficients of the heavy component and the time of the adsorption and desorption steps of the process. The thickness uniformity can be assessed from measurements of the thickness of the adsorbent or from the way in which it is fabricated. It is preferred that the uniformity of the adsorbent be such that the standard deviation of its thickness is less than about 25% of the average thickness. More preferably, the standard deviation of the thickness of the adsorbent is less than about 15% of the average thickness. It is even more preferred that the standard deviation of the adsorbent thickness be less than about 5% of the average thickness.

Calculation of these mass transfer rate constants is well known to those having ordinary skill in the art and may also be derived by those having ordinary skill in the art from standard testing data. D. M. Ruthven & C. Thaeron, Performance of a Parallel Passage Absorbent Contactor, Separation and Purification Technology 12 (1997) 43-60, which is incorporated herein by reference, clarifies many aspects of how the mass transfer is affected by the thickness of the adsorbent, channel gap and the cycle time of the process. Also, U.S. Pat. No. 6,607,584 to Moreau et al., which is also incorporated by reference, describes the details for calculating these transfer rates and associated coefficients for a given adsorbent and the test standard compositions used for conventional PSA.

Figure 34:
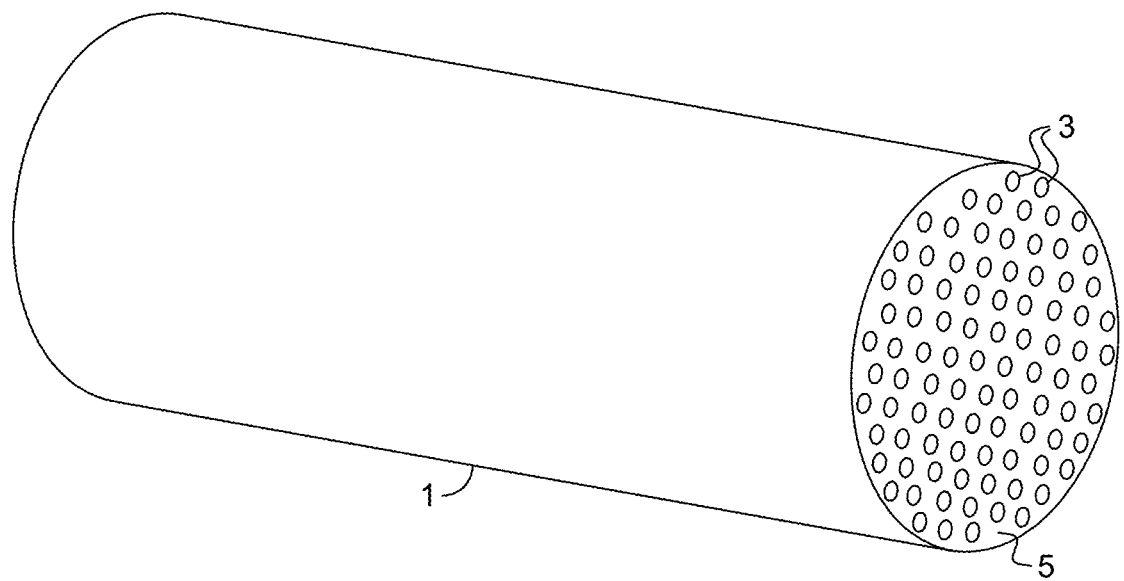
FIG. 34 is a representation of one embodiment of a parallel channel contactor in the form of a monolith directly formed from a microporous adsorbent and containing a plurality of parallel channels.

FIG. 34 hereof is a representation of a parallel channel contactor in the form of a monolith formed directly from a microporous adsorbent plus binder and containing a plurality of parallel flow channels. A wide variety of monolith shapes can be formed directly by extrusion processes. An example of a cylindrical monolith 1 is shown schematically in FIG. 34 hereof. The cylindrical monolith 1 contains a plurality of parallel flow channels 3. These flow channels 3 can have channel gaps from about 5 to about 1,000 microns, preferably from about 50 to about 250 microns, as long as all channels of a given contactor have substantially the same size channel gap. The channels can be formed having a variety of shapes including, but not limited to, round, square, triangular, and hexagonal. The space between the channels is occupied by the adsorbent 5. As shown the channels 3 occupy about 25% of the volume of the monolith and the adsorbent 5 occupies about 75% of the volume of the monolith. The adsorbent 5 can occupy from about 50% to about 98% of the volume of the monolith. The effective thickness of the adsorbent can be defined from the volume fractions occupied by the adsorbent 5 and channel structure as:

Effective Thickness of Adsorbent=½ Channel Diameter*(Volume Fraction of Adsorbent)/(Volume Fraction of Channels)

Figure 35:
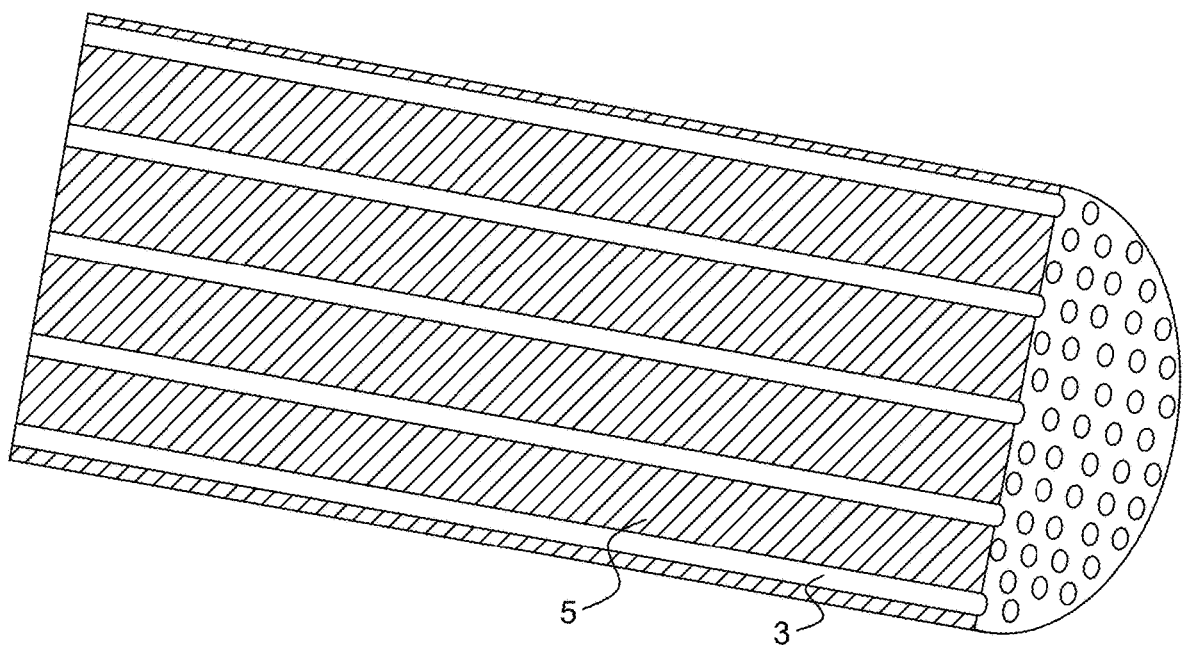
FIG. 35 is a cross-sectional representation along the longitudinal axis of the monolith of FIG. 34.
Figure 36:
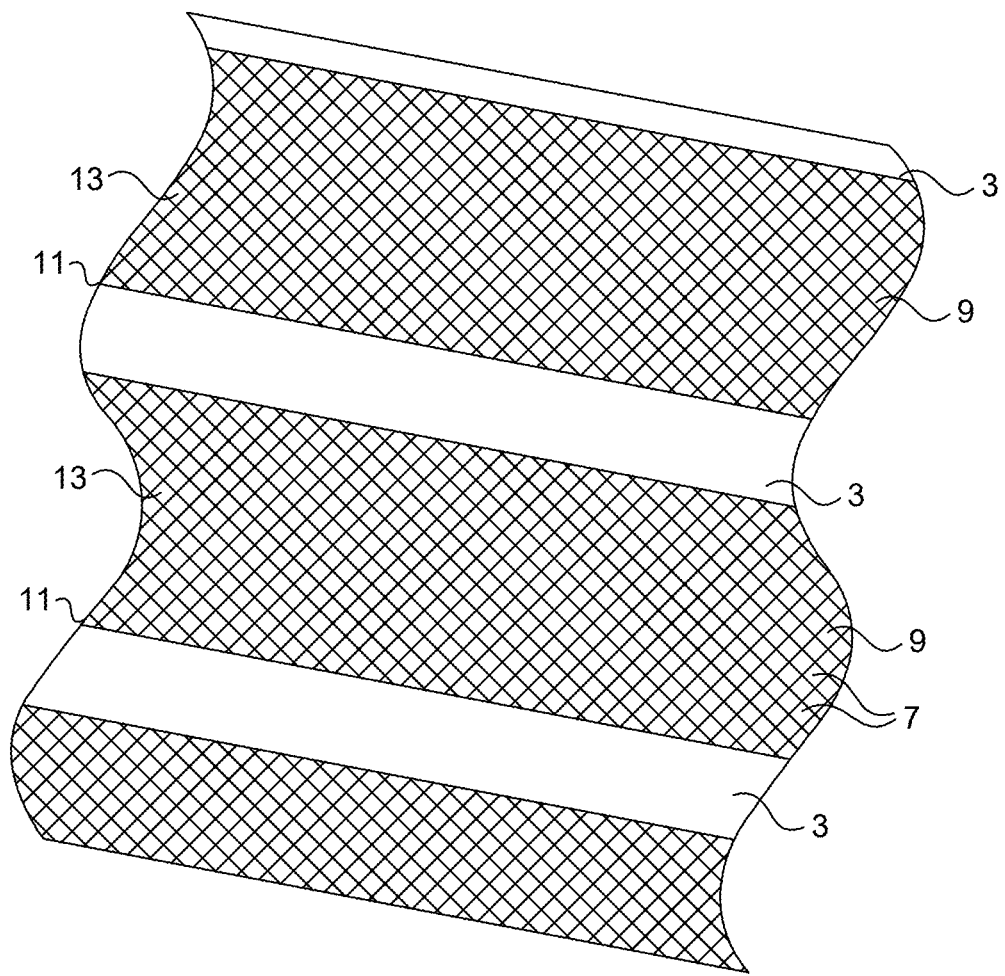
FIG. 36 is a representation of a magnified section of the cross-sectional view of the monolith of FIG. 34 showing the detailed structure of the adsorbent layer along with a blocking agent occupying some of the mesopores and macropores.

For the monolith of FIG. 34 hereof the effective thickness of the adsorbent will be about 1.5 times the diameter of the feed channel. When the channel diameter is in a range from about 50 to about 250 microns it is preferred that the thickness of the adsorbent layer, in the case wherein the entire contactor is not comprised of the adsorbent, be in a range from about 25 to about 2,500 microns. For a 50 micron diameter channel, the preferred range of thickness for the adsorbent layer is from about 25 to about 300 microns, more preferred range from about 50 to about 250 microns. FIG. 35-2 is a cross-sectional view along the longitudinal axis showing feed channels 3 extending through the length of the monolith with the walls of the flow channels formed entirely from adsorbent 5 plus binder. A schematic diagram enlarging a small cross section of the feed channels 3 and adsorbent layer 5 of FIG. 35 is shown in FIG. 36 hereof. The adsorbent layer is comprised of a microporous adsorbent, or polymeric, particles 7; solid particles (thermal mass) 9; that act as heat sinks, a blocking agent 13 and open mesopores and micropores 11. As shown, the microporous adsorbent or polymeric particles 7 occupy about 60% of the volume of the adsorbent layer and the particles of thermal mass 9 occupy about 5% of the volume. With this composition, the voidage (flow channels) is about 55% of the volume occupied by the microporous adsorbent or polymeric particles. The volume of the microporous adsorbent 5 or polymeric particles 7 can range from about 25% of the volume of the adsorbent layer to about 98% of the volume of the adsorbent layer. In practice, the volume fraction of solid particles 9 used to control heat will range from about 0% to about 75%, preferably about 5% to about 75%, and more preferably from about 10% to about 60% of the volume of the adsorbent layer. A blocking agent 13 fills the desired amount of space or voids left between particles so that the volume fraction of open mesopores and macropores 11 in the adsorbent layer 5 is less than about 20%.

When the monolith is used in a gas separation process that relies on a kinetic separation (predominantly diffusion controlled) it is advantageous for the microporous adsorbent or polymeric particles 7 to be substantially the same size. It is preferred that the standard deviation of the volume of the individual microporous adsorbent or polymeric particles 7 be less than 100% of the average particle volume for kinetically controlled processes. In a more preferred embodiment the standard deviation of the volume of the individual microporous adsorbent or polymeric particles 7 is less than 50% of the average particle volume. The particle size distribution for zeolite adsorbents can be controlled by the method used to synthesize the particles. It is also possible to separate pre-synthesized microporous adsorbent particles by size using methods such as a gravitational settling column. It may also be advantageous to use uniformly sized microporous adsorbent or polymeric particles in equilibrium controlled separations.

There are several ways that monoliths can be formed directly from a structured microporous adsorbent. For example, when the microporous adsorbent is a zeolite, the monolith can be prepared by extruding an aqueous mixture containing effective amounts of a solid binder, zeolite and adsorbent, solid heat control particles, and polymer. The solid binder can be colloidal sized silica or alumina that is used to bind the zeolite and solid heat control particles together. The effective amount of solid binder will typically range from about 0.5 to about 50% of the volume of the zeolite and solid heat control particles used in the mixture. If desired, silica binder materials can be converted in a post processing step to zeolites using hydrothermal synthesis techniques and, as such, they are not always present in a finished monolith. A polymer is optionally added to the mixture for rheology control and to give green extrudate strength. The extruded monolith is cured by firing it in a kiln where the water evaporates and the polymer burns away, thereby resulting in a monolith of desired composition. After curing the monolith, the adsorbent layer 5 will have about 20 to about 40 vol. % mesopores and macropores. A predetermined amount of these pores can be filled with a blocking agent 13, as previously discussed, in a subsequent step such as by vacuum impregnation.

Another method by which a monolith can be formed directly from a microporous adsorbent is by extruding a polymer and microporous adsorbent mixture. Preferred microporous adsorbents for use in extrusion process are carbon molecular sieves and zeolites. Non-limiting examples of polymers suitable for the extrusion process include epoxies, thermoplastics, and curable polymers such as silicone rubbers that can be extruded without an added solvent. When these polymers are used in the extrusion process, the resulting product will preferably have a low volume fraction of mesopores and macropores in the adsorbent layer.

Figure 37:
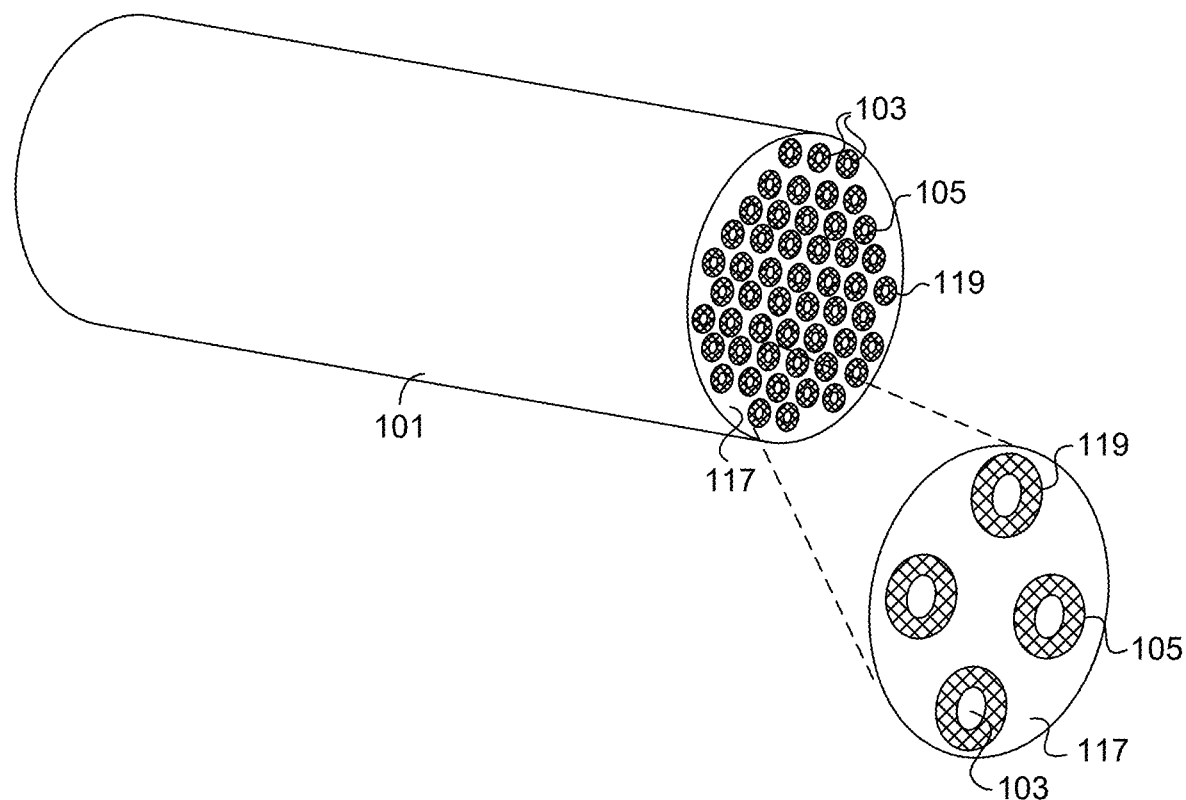
FIG. 37 is another representation of an embodiment of a parallel channel contactor in the form of a coated monolith where the adsorbent layer is coated onto the channel wall.

FIG. 37 hereof is a representation of a parallel channel contactor 101 in the form of a coated monolith where an adsorbent layer is coated onto the walls of the flow channels of a preformed monolith. For the parallel channel contactors of FIG. 37, an extrusion process is used to form a monolith from a suitable non-adsorbent solid material, preferably a metal such as steel, a ceramic such as cordierite, or a carbon material. By the term "non-adsorbent solid material" we mean a solid material that is not to be used as the selective adsorbent for the parallel channel contactor. An effective amount and thickness of a ceramic or metallic glaze, or sol gel coating, 119 is preferably applied to effectively seal the channel walls of the monolith. Such glazes can be applied by slurry coating the channel walls, by any suitable conventional means, followed by firing the monolith in a kiln.

Oxygen enrichment in accordance with this disclosure may be useful for a variety of applications, for example, for pre-treatment of air for natural gas combined cycle (NGCC) feed, cryogenic pre-treatment, fluid catalytic cracking (FCC), steam methane reformer (SMR), biofuel/biomass gasification, and the like.

In an embodiment, the size and energy of cryogenic air separation units (ASUs) can be reduced by configuring pressure swing adsorption (PSA) into the ASUs. Illustrative configurations are shown in FIG. 38 including an ASU configuration, PSA+ASU hybrid configuration, and ASU+PSA hybrid configuration.

Figure 38:
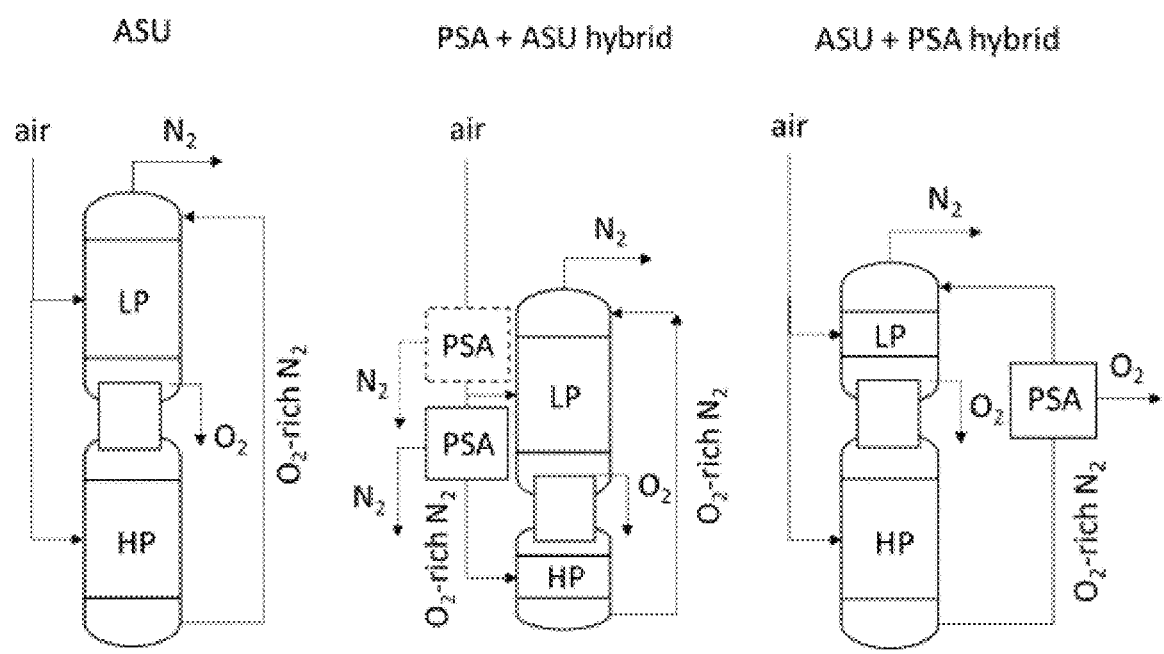
FIG. 38 shows illustrative cryogenic air separation unit (ASU) configurations which reduce the size and energy of the ASUs.

In FIG. 38, the PSA+ASU hybrid configuration involves PSA which pre-concentrates oxygen by rejection of at least a part of nitrogen. This can reduce the size and energy input into the bottom high pressure (HP) section of the ASU. The size of the low pressure (LP) section can be reduced as well in case PSA treats entire air stream (dashed PSA in FIG. 38). PSA unit(s) in this configuration can run at ambient temperature or, more preferably, after heat exchangers at sub-ambient temperatures to ensure high efficiency (high capacity and high kinetic selectivity) of PSA process.

Also, in FIG. 38, the ASU+PSA hybrid configuration involves a PSA installed in $O_2$-rich stream after the HP section purifies a part of $O_2$ and, therefore, reduces the size and energy of LP section. Given the $O_2$-rich stream after HP section is at cryogenic temperature, efficiency (high capacity and high kinetic selectivity) of PSA unit can be high.

Preferred separation embodiments of this disclosure are described below.

Embodiment 1. A process of adsorbing oxygen from a feed stream containing oxygen, nitrogen and argon, comprising passing the feed stream through a bed of an adsorbent comprising zeolite ITQ-55 to adsorb oxygen from the feed stream, thereby producing a product stream depleted in oxygen; wherein the zeolite ITQ-55 has a mean crystal particle size within the range of from about 0.1 microns to about 40 microns; wherein the feed stream is exposed to the zeolite ITQ-55 at effective conditions for performing a kinetic separation, in which the kinetic separation exhibits greater kinetic selectivity for oxygen than for nitrogen and argon.

Embodiment 2. The process of embodiment 1, which is a swing adsorption process comprising an adsorption step performed at elevated pressure and/or reduced temperature in which the feed stream is passed through a bed of adsorbent comprising the zeolite ITQ-55 to adsorb oxygen from the feed stream, and a desorption step performed at reduced pressure and/or elevated temperature in which oxygen from the previous adsorption step is desorbed from the bed to regenerate the bed for the next adsorption step.

Embodiment 3. The process of embodiment 2, which is a rapid swing adsorption process, wherein the rapid swing adsorption process is selected from rapid cycle thermal swing adsorption (RCTSA), rapid cycle pressure swing adsorption (RCPSA), rapid cycle vacuum pressure swing adsorption (RCVPSA), or a combination of these processes.

Embodiment 4. The process of embodiment 2, wherein the bed of adsorbent is configured as a monolith having a plurality of parallel channels.

Embodiment 5. The process of embodiment 1, wherein the kinetic separation exhibits greater kinetic selectivity for oxygen than for nitrogen, at a temperature from about −195° C. to about 30° C.

Embodiment 6. The process of embodiment 1, wherein the kinetic separation exhibits greater kinetic selectivity for oxygen than for nitrogen, at a pressure of about 1 bar (~14.7 psi) to about 30 bar (~435 psi).

Embodiment 7. The process of embodiment 1, wherein the zeolite ITQ-55 has a mean crystal particle size within the range of from about 0.5 microns to about 10 microns, or a mean crystal particle size within the range of from about 1 micron to about 5 microns.

Embodiment 8. The process of embodiment 1, wherein the zeolite ITQ-55 has a mean crystal particle size within the range of from about 0.5 microns to about 2 microns.

Embodiment 9. The process of embodiment 1, wherein the kinetic separation exhibits faster kinetic activity for oxygen than for nitrogen, at a temperature from about −195° C. to about 30° C.

Embodiment 10. The process of embodiment 1, wherein the kinetic separation exhibits faster kinetic activity for oxygen than for nitrogen, at a pressure of about 1 bar (~14.7 psi) to about 30 bar (~435 psi).

Embodiment 11. The process of embodiment 1, wherein the oxygen equilibrium capacity is from about 0.1 mol/kg to about 2 mol/kg.

Embodiment 12. The process of embodiment 1, which is a swing adsorption process comprising a feed step, one or more down equalization steps, a co-current or counter-current blow down and depressurization, one or more up equalization steps, and feed repressurization.

Embodiment 13. The process of embodiment 1, wherein the feed stream comprises air including humid air and dry air, an oxygen-containing stream, a stream containing oxygen and nitrogen, or a stream containing oxygen and argon.

Embodiment 14. The process of embodiment 1, further comprising collecting the desorbed oxygen as an oxygen-enriched stream.

Embodiment 15. The process of embodiment 1, wherein oxygen is desorbed at a temperature from about 20° C. to about 100° C.

Embodiment 16. The process of embodiment 1, wherein oxygen is desorbed at a pressure from about 0.1 bar (~1.5 psi) to about 10 bar (~145 psi).

Embodiment 17. The process of embodiment 2, wherein the swing adsorption process is pressure swing adsorption (PSA) which is configured into a cryogenic air separation unit (ASU), wherein the configuration is a PSA+ASU hybrid configuration in which the PSA pre-concentrates oxygen by rejection of at least a part of nitrogen, or an ASU+PSA hybrid configuration in which the PSA is installed in an $O_2$-rich stream after a high pressure (HP) section of the ASU purifies a part of $O_2$.

Embodiment 18. The process of embodiment 14, wherein the oxygen-enriched stream is used in a cryogenic air separation unit (ASU), a fluid catalytic cracking (FCC) unit, a natural gas combined cycle (NGCC) unit, a steam methane reformer (SMR) unit, or any combustion or gasification not limited to natural gas, coal, or bio-mass.

Embodiment 19. The process of embodiment 1, wherein oxygen purity is greater than about 25%.

Embodiment 20. The process of embodiment 1, wherein nitrogen purity is greater than about 90%.

Embodiment 21. The process of embodiment 1 further comprising tuning kinetic selectivity and mass transfer rates by varying the mean crystal particle size of zeolite ITQ-55 within the range of from about 0.1 microns to about 40 microns, or by varying the adsorption temperature within the range from about −195° C. to about 30° C., or by varying the adsorption pressure within the range from about 1 bar (~14.7 psi) to about 30 bar (~435 psi), or combinations thereof.

Embodiment 22. A method for separating fluids, comprising:
 exposing an input fluid stream comprising a first fluid component and a second fluid component to an adsorbent comprising zeolite ITQ-55 to form a rejection product fluid stream, a molar ratio of the first fluid component to the second fluid component in the rejection product fluid stream being less than a molar ratio of the first fluid component to the second fluid component in the input fluid stream;
 collecting the rejection product fluid stream;
 forming an adsorbed product fluid stream (e.g., by carrying out an equalization and/or depressurization step), a molar ratio of the first fluid component to the second fluid component in the adsorbed product stream being greater than the molar ratio of the first fluid component to the second fluid component in the input fluid stream; and
 collecting the adsorbed product fluid stream,
 wherein the zeolite ITQ-55 has a mean crystal particle size within the range of from about 0.1 microns to about 40 microns; wherein the input fluid stream is exposed to the zeolite ITQ-55 at effective conditions for performing a kinetic separation, in which the kinetic separation exhibits greater kinetic selectivity for the first fluid component than for the second fluid component.

Embodiment 23. The method of embodiment 22, wherein the first fluid component is oxygen, and the second fluid component is nitrogen, argon, or a combination thereof.

Embodiment 24. The method of embodiment 22, wherein the first fluid component is oxygen, argon, or a combination thereof, and the second fluid component is nitrogen.

Embodiment 25. The method of embodiment 22, wherein the adsorbed product fluid stream comprises an oxygen-enriched stream, and the rejection product fluid stream comprises a nitrogen-enriched stream.

Embodiment 26. The method of embodiment 22, wherein the adsorbed product fluid stream comprises an oxygen/argon-enriched stream, and the rejection product fluid stream comprises a nitrogen-enriched stream.

Embodiment 27. The method of embodiment 22, which is a swing adsorption method comprising an adsorption step performed at elevated pressure and/or reduced temperature in which the feed stream is passed through a bed of adsorbent comprising the zeolite ITQ-55 to adsorb oxygen from the input fluid stream, and a desorption step performed at reduced pressure and/or elevated temperature in which oxygen from the previous adsorption step is desorbed from the bed to regenerate the bed for the next adsorption step.

Embodiment 28. The method of embodiment 27, which is a rapid swing adsorption method, wherein the rapid swing adsorption me method selected from rapid cycle thermal swing adsorption (RCTSA), rapid cycle pressure swing adsorption (RCPSA), rapid cycle vacuum pressure swing adsorption (RCVPSA).

Embodiment 29. The method of embodiment 27, wherein the adsorption/desorption has a cycle time from about 0.1 seconds to about 1000 seconds.

Embodiment 30. The method of embodiment 22, wherein the bed of adsorbent is configured as a monolith having a plurality of parallel channels.

Embodiment 31. The method of embodiment 22, wherein the kinetic separation exhibits greater kinetic selectivity for oxygen than for nitrogen, at a temperature from about −195° C. to about 30° C.

Embodiment 32. The method of embodiment 22, wherein the kinetic separation exhibits greater kinetic selectivity for oxygen than for nitrogen, at a pressure of about 1 bar (~14.7 psi) to about 30 bar (~435 psi).

Embodiment 33. The method of embodiment 22, wherein the zeolite ITQ-55 has a mean crystal particle size within the range of from about 0.5 microns to about 10 microns, or a mean crystal particle size within the range of from about 1 micron to about 5 microns.

Embodiment 34. The method of embodiment 22, wherein the zeolite ITQ-55 has a mean crystal particle size within the range of from about 0.5 microns to about 2 microns.

Embodiment 35. The method of embodiment 22, wherein the kinetic separation exhibits faster kinetic activity for oxygen than for nitrogen, at a temperature from about −195° C. to about 30° C.

Embodiment 36. The method of embodiment 22, wherein the kinetic separation exhibits faster kinetic activity for oxygen than for nitrogen, at a pressure of about 1 bar (~14.7 psi) to about 30 bar (~435 psi).

Embodiment 37. The method of embodiment 22, wherein the oxygen equilibrium capacity is from about 0.1 mol/kg to about 2 mol/kg.

Embodiment 38. The process of embodiment 22, which is a swing adsorption process comprising a feed step, one or more down equalization steps, a co-current or counter-current blow down and depressurization, one or more up equalization steps, and feed repressurization.

Embodiment 39. The method of embodiment 22, wherein the feed stream comprises air including humid air and dry air, flue gas, an oxygen-containing stream, a stream containing oxygen and nitrogen, or a stream containing oxygen and argon.

Embodiment 40. The method of embodiment 22, wherein oxygen is desorbed at a temperature from about 20° C. to about 100° C.

Embodiment 41. The method of embodiment 22, wherein oxygen is desorbed at a pressure from about 0.1 bar (~1.5 psi) to about 10 bar (~145 psi).

Embodiment 42. The method of embodiment 27, wherein the swing adsorption process is pressure swing adsorption (PSA) which is configured into a cryogenic air separation unit (ASU), wherein the configuration is a PSA+ASU hybrid configuration in which the PSA pre-concentrates oxygen by rejection of at least a part of nitrogen, or an ASU+PSA hybrid configuration in which the PSA is installed in an $O_2$-rich stream after a high pressure (HP) section of the ASU purifies a part of $O_2$.

Embodiment 43. The method of embodiment 25, wherein the oxygen-enriched stream is used in a cryogenic air separation unit (ASU), a fluid catalytic cracking (FCC) unit, a natural gas combined cycle (NGCC) unit, a steam methane reformer (SMR) unit, or any combustion or gasification not limited to natural gas, coal, or bio-mass.

Embodiment 44. The method of embodiment 22, wherein oxygen purity in the adsorbed product stream is greater than about 25%.

Embodiment 45. The method of embodiment 22, wherein nitrogen purity in the rejection product fluid stream is greater than about 90%.

Embodiment 46. The method of embodiment 22 further comprising tuning kinetic selectivity and mass transfer rates by varying the mean crystal particle size of zeolite ITQ-55 within the range of from about 0.1 microns to about 40 microns, or by varying the adsorption temperature within the range from about −195° C. to about 30° C., or by varying the adsorption pressure within the range from about 1 bar (~14.7 psi) to about 30 bar (~435 psi), or combinations thereof.

Embodiment 47. A process of adsorbing oxygen from a feed stream containing oxygen and nitrogen, comprising passing the feed stream through a bed of an adsorbent comprising zeolite ITQ-55 to adsorb oxygen from the feed stream, thereby producing a product stream depleted in oxygen; wherein the zeolite ITQ-55 has a mean crystal particle size within the range of from about 0.1 microns to about 40 microns; wherein the feed stream is exposed to the zeolite ITQ-55 at effective conditions for performing a kinetic separation, in which the kinetic separation exhibits greater kinetic selectivity for oxygen than for nitrogen.

Embodiment 48. The process of embodiment 47, which is a swing adsorption process comprising an adsorption step performed at elevated pressure and/or reduced temperature in which the feed stream is passed through a bed of adsorbent comprising the zeolite ITQ-55 to adsorb oxygen from the feed stream, and a desorption step performed at reduced pressure and/or elevated temperature in which oxygen from the previous adsorption step is desorbed from the bed to regenerate the bed for the next adsorption step.

Embodiment 49. The process of embodiment 47, which is a rapid swing adsorption process, wherein the rapid swing adsorption process is selected from rapid cycle thermal swing adsorption (RCTSA), rapid cycle pressure swing adsorption (RCPSA), and rapid cycle vacuum pressure swing adsorption (RCVPSA).

Embodiment 50. The process of embodiment 48, wherein the bed of adsorbent is configured as a monolith having a plurality of parallel channels.

Embodiment 51. The process of embodiment 47, wherein the kinetic separation exhibits greater kinetic selectivity for oxygen than for nitrogen, at a temperature from about −195° C. to about 30° C.

Embodiment 52. The process of embodiment 47, wherein the kinetic separation exhibits greater kinetic selectivity for oxygen than for nitrogen, at a pressure of about 1 bar (~14.7 psi) to about 30 bar (~435 psi).

Embodiment 53. The process of embodiment 47, wherein the zeolite ITQ-55 has a mean crystal particle size within the range of from about 0.5 microns to about 10 microns, or a mean crystal particle size within the range of from about 1 micron to about 5 microns.

Embodiment 54. The process of embodiment 47, wherein the zeolite ITQ-55 has a mean crystal particle size within the range of from about 0.5 microns to about 2 microns.

Embodiment 55. The process of embodiment 47, wherein the kinetic separation exhibits faster kinetic activity for oxygen than for nitrogen, at a temperature from about −195° C. to about 30° C.

Embodiment 56. The process of embodiment 47, wherein the kinetic separation exhibits faster kinetic activity for oxygen than for nitrogen, at a pressure of about 1 bar (~14.7 psi) to about 30 bar (~435 psi).

Embodiment 57. The process of embodiment 47, wherein the oxygen equilibrium capacity is from about 0.1 mol/kg to about 2 mol/kg.

Embodiment 58. The process of embodiment 47, which is a swing adsorption process comprising a feed step, one or more down equalization steps, a co-current or counter-current blow down and depressurization, one or more up equalization steps, and feed repressurization.

Embodiment 59. The process of embodiment 47, wherein the feed stream comprises air including humid air and dry air, flue gas, an oxygen-containing stream, or a stream containing oxygen and nitrogen.

Embodiment 60. The process of embodiment 47, further comprising collecting the desorbed oxygen as an oxygen-enriched stream.

Embodiment 61. The process of embodiment 47, wherein oxygen is desorbed at a temperature from about 20° C. to about 100° C.

Embodiment 62. The process of embodiment 47, wherein oxygen is desorbed at a pressure from about 0.1 bar (~1.5 psi) to about 10 bar (~145 psi).

Embodiment 63. The process of embodiment 47, wherein the swing adsorption process is pressure swing adsorption (PSA) which is configured into a cryogenic air separation unit (ASU), wherein the configuration is a PSA+ASU hybrid configuration in which the PSA pre-concentrates oxygen by rejection of at least a part of nitrogen, or an ASU+PSA hybrid configuration in which the PSA is installed in an $O_2$-rich stream after a high pressure (HP) section of the ASU purifies a part of $O_2$.

Embodiment 64. The process of embodiment 60, wherein the oxygen-enriched stream is used in a cryogenic air separation unit (ASU), a fluid catalytic cracking (FCC) unit, a natural gas combined cycle (NGCC) unit, or a steam methane reformer (SMR) unit, or any combustion or gasification not limited to natural gas, coal, or bio-mass.

Embodiment 65. The process of embodiment 47, wherein oxygen purity is greater than about 25%.

Embodiment 66. The process of embodiment 47, wherein nitrogen purity is greater than about 90%.

Embodiment 67. The process of embodiment 47 further comprising tuning kinetic selectivity and mass transfer rates by varying the mean crystal particle size of zeolite ITQ-55 within the range of from about 0.1 microns to about 40 microns, or by varying the adsorption temperature within the range from about −195° C. to about 30° C., or by varying the adsorption pressure within the range from about 1 bar (~14.7 psi) to about 30 bar (~435 psi), or combinations thereof.

Embodiment 68. A process of adsorbing oxygen from a feed stream containing oxygen and argon, comprising passing the feed stream through a bed of an adsorbent comprising zeolite ITQ-55 to adsorb oxygen from the feed stream, thereby producing a product stream depleted in oxygen; wherein the zeolite ITQ-55 has a mean crystal particle size within the range of from about 0.1 microns to about 40 microns; wherein the feed stream is exposed to the zeolite ITQ-55 at effective conditions for performing a kinetic separation, in which the kinetic separation exhibits greater kinetic selectivity for oxygen than for argon.

Embodiment 69. The process of embodiment 68, which is a swing adsorption process comprising an adsorption step performed at elevated pressure and/or reduced temperature in which the feed stream is passed through a bed of adsorbent comprising the zeolite ITQ-55 to adsorb oxygen from the feed stream, and a desorption step performed at reduced pressure and/or elevated temperature in which oxygen from the previous adsorption step is desorbed from the bed to regenerate the bed for the next adsorption step.

Embodiment 70. The process of embodiment 69, which is a rapid swing adsorption process, wherein the rapid swing adsorption process is selected from rapid cycle thermal swing adsorption (RCTSA), rapid cycle pressure swing adsorption (RCPSA), and rapid cycle vacuum pressure swing adsorption (RCVPSA).

Embodiment 71. The process of embodiment 69, wherein the bed of adsorbent is configured as a monolith having a plurality of parallel channels.

Embodiment 72. The process of embodiment 68, wherein the kinetic separation exhibits greater kinetic selectivity for oxygen than for argon, at a temperature from about −195° C. to about 30° C.

Embodiment 73. The process of embodiment 68, wherein the kinetic separation exhibits greater kinetic selectivity for oxygen than for argon, at a pressure of about 1 bar (~14.7 psi) to about 30 bar (~435 psi).

Embodiment 74. The process of embodiment 68, wherein the zeolite ITQ-55 has a mean crystal particle size within the range of from about 0.5 microns to about 10 microns, or a mean crystal particle size within the range of from about 1 micron to about 5 microns.

Embodiment 75. The process of embodiment 68, wherein the zeolite ITQ-55 has a mean crystal particle size within the range of from about 0.5 microns to about 2 microns.

Embodiment 76. The process of embodiment 68, wherein the kinetic separation exhibits faster kinetic activity for oxygen than for argon, at a temperature from about −195° C. to about 30° C.

Embodiment 77. The process of embodiment 68, wherein the kinetic separation exhibits faster kinetic activity for oxygen than for argon, at a pressure of about 1 bar (~14.7 psi) to about 30 bar (~435 psi).

Embodiment 78. The process of embodiment 68, wherein the oxygen equilibrium capacity is from about 0.1 mol/kg to about 2 mol/kg.

Embodiment 79. The process of embodiment 68, which is a swing adsorption process comprising a feed step, one or more down equalization steps, a co-current or counter-current blow down and depressurization, one or more up equalization steps, and feed repressurization.

Embodiment 80. The process of embodiment 68, wherein the feed stream comprises air including humid air and dry air, flue gas, an oxygen-containing stream, or a stream containing oxygen and argon.

Embodiment 81. The process of embodiment 68, further comprising collecting the desorbed oxygen as an oxygen-enriched stream.

Embodiment 82. The process of embodiment 68, wherein oxygen is desorbed at a temperature from about 20° C. to about 100° C.

Embodiment 83. The process of embodiment 63, wherein oxygen is desorbed at a pressure from about 0.1 bar (~1.5 psi) to about 10 bar (~145 psi).

Embodiment 84. The process of embodiment 69, wherein the swing adsorption process is pressure swing adsorption (PSA) which is configured into a cryogenic air separation unit (ASU), wherein the configuration is a PSA+ASU hybrid configuration in which the PSA pre-concentrates oxygen by rejection of at least a part of nitrogen, or an ASU+PSA hybrid configuration in which the PSA is installed in an $O_2$-rich stream after a high pressure (HP) section of the ASU purifies a part of $O_2$.

Embodiment 85. The process of embodiment 81, wherein the oxygen-enriched stream is used in a cryogenic air separation unit (ASU), a fluid catalytic cracking (FCC) unit, a natural gas combined cycle (NGCC) unit, or a steam methane reformer (SMR) unit, or any combustion or gasification not limited to natural gas, coal, or bio-mass.

Embodiment 86. The process of embodiment 68, wherein oxygen purity is greater than about 25%.

Embodiment 87. The process of embodiment 68, wherein argon purity is greater than about 25%.

Embodiment 88. The process of embodiment 68 further comprising tuning kinetic selectivity and mass transfer rates by varying the mean crystal particle size of zeolite ITQ-55 within the range of from about 0.1 microns to about 40 microns, or by varying the adsorption temperature within the range from about −195° C. to about 30° C., or by varying the adsorption pressure within the range from about 1 bar (~14.7 psi) to about 30 bar (~435 psi), or combinations thereof.

Embodiment 89. A process of adsorbing oxygen from a feed stream comprising oxygen, nitrogen, and water, comprising passing the feed stream through one or more beds of adsorbent comprising a first adsorbent selective for water so as to adsorb water from the feed stream and a second adsorbent selective for oxygen so as to adsorb oxygen from the feed stream, thereby producing a rejection product stream enriched in nitrogen and depleted in oxygen and water, wherein the first bed comprises a dehydration adsorbent and the second bed comprise ITQ-55; wherein the zeolite ITQ-55 has a mean crystal particle size within the range of from about 0.1 microns to about 40 microns; wherein the feed stream is exposed to the first adsorbent at effective conditions to remove water from the feed stream; and wherein the feed stream is exposed to the second adsorbent at effective conditions for performing a kinetic separation, in which the kinetic separation exhibits greater kinetic selectivity for oxygen than for nitrogen.

Embodiment 90. The process of embodiment 89, which is a swing adsorption process comprising an adsorption step performed at elevated pressure and/or reduced temperature in which the feed stream is passed through a bed of second adsorbent comprising the zeolite ITQ-55 to adsorb oxygen from the feed stream, and a desorption step performed at reduced pressure and/or elevated temperature in which oxygen from the previous adsorption step is desorbed from the bed to regenerate the bed for the next adsorption step.

Embodiment 91. The process of embodiment 90, which is a rapid swing adsorption process, wherein the rapid swing adsorption process is selected from rapid cycle thermal swing adsorption (RCTSA), rapid cycle pressure swing adsorption (RCPSA), and rapid cycle vacuum pressure swing adsorption (RCVPSA).

Embodiment 92. The process of embodiment 89, wherein the bed of adsorbent is configured as a monolith having a plurality of parallel channels.

Embodiment 93. The process of embodiment 89, wherein the kinetic separation exhibits greater kinetic selectivity for oxygen than for nitrogen, at a temperature from about −195° C. to about 30° C.

Embodiment 94. The process of embodiment 89, wherein the kinetic separation exhibits greater kinetic selectivity for oxygen than for nitrogen, at a pressure of about 1 bar (~14.7 psi) to about 30 bar (~435 psi).

Embodiment 95. The process of embodiment 89, wherein the zeolite ITQ-55 has a mean crystal particle size within the range of from about 0.5 microns to about 10 microns, or a mean crystal particle size within the range of from about 1 micron to about 5 microns.

Embodiment 96. The process of embodiment 89, wherein the zeolite ITQ-55 has a mean crystal particle size within the range of from about 0.5 microns to about 2 microns.

Embodiment 97. The process of embodiment 89, wherein the kinetic separation exhibits faster kinetic activity for oxygen than for nitrogen, at a temperature from about −195° C. to about 30° C.

Embodiment 98. The process of embodiment 89, wherein the kinetic separation exhibits faster kinetic activity for oxygen than for nitrogen, at a pressure of about 1 bar (~14.7 psi) to about 30 bar (~435 psi).

Embodiment 99. The process of embodiment 89, wherein the oxygen equilibrium capacity is from about 0.1 mol/kg to about 2 mol/kg.

Embodiment 100. The process of embodiment 89, which is a swing adsorption process comprising a feed step, one or more down equalization steps, a co-current or counter-current blow down and depressurization, one or more up equalization steps, and feed repressurization.

Embodiment 101. The process of embodiment 89, wherein the second adsorbent is an aluminophosphate (AlPO) zeolite, an aluminosilicate zeolite, a silicoaluminophosphate (SAPO) zeolite, a silica zeolite, or combinations thereof.

Embodiment 102. The process of embodiment 89, wherein the second adsorbent is selected from the group consisting of zeolite 3A, zeolite 4A, zeolite 5A, and zeolite 13X.

Embodiment 103. The process of embodiment 89, wherein the feed stream comprises air including humid air and dry air, flue gas, an oxygen-containing stream, or a stream containing oxygen and nitrogen.

Embodiment 104. The process of embodiment 89, further comprising collecting the desorbed oxygen as an oxygen-enriched stream.

Embodiment 105. The process of embodiment 89, wherein oxygen is desorbed at a temperature from about 20° C. to about 100° C.

Embodiment 106. The process of embodiment 89, wherein oxygen is desorbed at a pressure from about 0.1 bar (~1.5 psi) to about 10 bar (~145 psi).

Embodiment 107. The process of embodiment 90, wherein the swing adsorption process is pressure swing adsorption (PSA) which is configured into a cryogenic air separation unit (ASU), wherein the configuration is a PSA+ASU hybrid configuration in which the PSA pre-concentrates oxygen by rejection of at least a part of nitrogen, or an ASU+PSA hybrid configuration in which the PSA is installed in an $O_2$-rich stream after a high pressure (HP) section of the ASU purifies a part of $O_2$.

Embodiment 108. The process of embodiment 107, wherein the oxygen-enriched stream is used in a cryogenic air separation unit (ASU), a fluid catalytic cracking (FCC) unit, a natural gas combined cycle (NGCC) unit, a steam methane reformer (SMR) unit, or any combustion or gasification not limited to natural gas, coal, or bio-mass.

Embodiment 109. The process of embodiment 89, wherein oxygen purity is greater than about 25%.

Embodiment 110. The process of embodiment 89, wherein nitrogen purity is greater than about 90%.

Embodiment 111. The process of embodiment 89 further comprising tuning kinetic selectivity and mass transfer rates by varying the mean crystal particle size of zeolite ITQ-55 within the range of from about 0.1 microns to about 40 microns, or by varying the adsorption temperature within the range from about −195° C. to about 30° C., or by varying the adsorption pressure within the range from about 1 bar (~14.7 psi) to about 30 bar (~435 psi), or combinations thereof.

Separation of $O_2$ from $N_2$

A commercially important type of separation is separation of $O_2$ from $N_2$. While air can be used as a feed for some reactions, in many situations it can be desirable to have a stream either enriched or depleted in oxygen relative to air. In addition to separating oxygen from nitrogen with a starting stream of air, such separations can generally be performed on other streams containing both oxygen and nitrogen.

Oxygen can be separated from nitrogen using an adsorbent and/or membrane that includes zeolite ITQ-55. Adsorption can be performed using any convenient type of process, such as a swing adsorption process. For separation by adsorption, a stream that contains oxygen and nitrogen can be exposed to an adsorbent structure. Oxygen can generally have a smaller kinetic diameter and/or higher affinity for ITQ-55, so it is believed that oxygen can preferentially enter the pore structure of zeolite ITQ-55. The surface of the adsorbent structure can be composed of and/or include zeolite ITQ-55 in a manner so that fluids that enter the adsorbent structure can enter by passing through pores of the ITQ-55. Depending on the adsorbent structure, defects in the ITQ-55 crystal structure and/or defects between crystals can allow some fluids to enter the adsorbent structure without passing through the ITQ-55. Due to such defects, less than 100% of the fluids entering the adsorbent structure may pass through the ITQ-55 crystals, such as at least about 90 vol %, or at least about 95%, or at least about 98%.

Similarly, for separation by permeation through a membrane, a stream that contains oxygen and nitrogen can be exposed to a membrane structure. The surface of the membrane structure can be composed of and/or include zeolite ITQ-55 in a manner so that fluids that enter the membrane structure can enter by passing through pores of the ITQ-55. Depending on the adsorbent structure, defects in the ITQ-55 crystal structure and/or defects between crystals can allow some fluids to enter the membrane structure without passing through the ITQ-55. Due to such defects, less than 100% of the fluids entering the membrane structure may pass through the ITQ-55 crystals, such as at least about 90 vol %, or at least about 95%, or at least about 98%.

During a separation process, a fluid comprising oxygen and nitrogen can be exposed to an adsorbent or membrane structure. Based on the relative kinetic diameters and/or the relative affinities of oxygen and nitrogen for the ITQ-55, it is believed that the oxygen can preferentially enter the adsorbent or membrane structure relative to nitrogen. This can allow for selectivity for either oxygen or nitrogen (depending on the product stream that corresponds to a desired output), either for adsorption or for separation via membrane, of at least about 5, or at least about 10, or at least about 20, or at least about 30.

Optionally, the adsorption separation or membrane can be performed at a temperature from about −195° C. to about 30° C., preferably from about −50° C. to about 30° C., and more preferably from about −30° C. to about 20° C. This can enhance the selectivity of the ITQ-55 for performing the separation, as well as potentially increasing the capacity of an adsorbent structure for holding oxygen. Optionally, performing a separation at low temperature can also benefit from allowing water to be condensed out of a fluid prior to the fluid being exposed to the adsorbent or membrane structure. Optionally, a low temperature separation can be performed at any convenient pressure, such as a pressure of from about 1 bar (~14.7 psi) to about 30 bar (~435 psi), preferably from about 1 bar (~14.7 psi) to about 25 bar (~363 psi), and more preferably from about 1 bar (~14.7 psi) to about 20 bar (~290 psi). It is noted that at these separation conditions, the fluid being separated can optionally correspond to a liquid.

As another option, the separation can be performed at a temperature of about −200° C. to about 50° C. and at a pressure of about 1 bar (~14.7 psi) to about 50 bar (~725 psi). Under these conditions, entry of nitrogen can be reduced, minimized, or possibly eliminated. The minimized entry of nitrogen into the adsorbent structure or membrane structure can facilitate performing a separation with high selectivity.

As still another option, the separation can be performed at a temperature greater than about −200° C., or greater than about −150° C., or greater than about −100° C., such as up to about 50° C. or more. Additionally or alternately, the separation can be performed at a pressure greater than about 1 bar (~14.7 psi), or greater than about 10 bar (~145 psi), or greater than about 20 bar (~290 psi), or greater than about 30 bar (~435 psi), such as up to about 50 bar (~725 psi) or more. Additionally or alternately, the separation can be performed at any combination of a temperature and pressure range cited in this paragraph. Under these conditions, some nitrogen may be able to enter an adsorbent structure or membrane structure, but the separation can be performed with an oxygen selectivity as described above.

Illustrative $O_2$ adsorptive capacity can range from about 0.1 mol/kg to about 2 mol/kg, preferably from about 0.2 mol/kg to about 2 mol/kg, and more preferably from about 0.4 mol/kg to about 2 mol/kg.

Illustrative $O_2$ adsorption temperature can range from about −195° C. to about 30° C., preferably from about −50° C. to about 30° C., and more preferably from about −30° C. to about 20° C.

Illustrative $O_2$ desorption temperature can range from about 20° C. to about 100° C., preferably from about 25° C. to about 75° C., and more preferably from about 25° C. to about 50° C.

Illustrative $O_2$ adsorption pressure can range from about 1 bar (~14.7 psi) to about 30 bar (~435 psi), preferably from about 1 bar (~14.7 psi) to about 20 bar (~363 psi), and more preferably from about 1 bar (~14.7 psi) to about 10 bar (~290 psi).

Illustrative $O_2$ desorption pressure can range from about 0.1 bar (~1.5 psi) to about 10 bar (~145 psi), preferably from about 0.1 bar (~1.5 psi) to about 5 bar (~72.5 psi), and more preferably from about 0.1 bar (~1.5 psi) to about 1 bar (~14.5 psi).

Illustrative $O_2$ adsorption time can range from about 0.1 second to about 1000 seconds, preferably from about 1 seconds to about 500 seconds, and more preferably from about 1 seconds to about 100 seconds.

Illustrative $O_2$ desorption time can range from about 0.1 second to about 1000 seconds, preferably from about 1 seconds to about 500 seconds, and more preferably from about 1 seconds to about 100 seconds.

Illustrative $O_2$ content in the feed stream can range from about 2 wt. % to about 30 wt. %, preferably from about 2 wt. % to about 20 wt. %, and more preferably from about 2 wt. % to about 10 wt. %.

In an embodiment, using zeolite ITQ-55 in a PSA cycle with air feed, the PSA cycle time can range from about 1 second to about 3600 seconds, preferably from about 1 second to about 360 seconds, and more preferably from about 1 second to about 60 seconds.

Separation of $O_2$ from Argon

An important type of separation is separation of $O_2$ from argon. While air can be used as a feed for some reactions, in many situations it can be desirable to have a stream either enriched or depleted in oxygen relative to air. In addition to separating oxygen from argon with a starting stream of air, such separations can generally be performed on other streams containing both oxygen and argon.

Oxygen can be separated from argon using an adsorbent and/or membrane that includes zeolite ITQ-55. Adsorption can be performed using any convenient type of process, such as a swing adsorption process. For separation by adsorption, a stream that contains oxygen and argon can be exposed to an adsorbent structure. Oxygen can generally have a smaller kinetic diameter and/or higher affinity for ITQ-55, so it is believed that oxygen can preferentially enter the pore structure of zeolite ITQ-55. The surface of the adsorbent structure can be composed of and/or include zeolite ITQ-55 in a manner so that fluids that enter the adsorbent structure can enter by passing through pores of the ITQ-55. Depending on the adsorbent structure, defects in the ITQ-55 crystal structure and/or defects between crystals can allow some fluids to enter the adsorbent structure without passing through the ITQ-55. Due to such defects, less than 100% of the fluids entering the adsorbent structure may pass through the ITQ-55 crystals, such as at least about 90 vol %, or at least about 95%, or at least about 98%.

Similarly, for separation by permeation through a membrane, a stream that contains oxygen and argon can be exposed to a membrane structure. The surface of the membrane structure can be composed of and/or include zeolite ITQ-55 in a manner so that fluids that enter the membrane structure can enter by passing through pores of the ITQ-55. Depending on the adsorbent structure, defects in the ITQ-55 crystal structure and/or defects between crystals can allow some fluids to enter the membrane structure without passing through the ITQ-55. Due to such defects, less than 100% of the fluids entering the membrane structure may pass through the ITQ-55 crystals, such as at least about 90 vol %, or at least about 95%, or at least about 98%.

During a separation process, a fluid comprising oxygen and argon can be exposed to an adsorbent or membrane structure. Based on the relative kinetic diameters and/or the relative affinities of oxygen and argon for the ITQ-55, it is believed that the oxygen can preferentially enter the adsorbent or membrane structure relative to argon. This can allow for selectivity for either oxygen or argon (depending on the product stream that corresponds to a desired output), either for adsorption or for separation via membrane, of at least about 5, or at least about 10, or at least about 20, or at least about 30.

Optionally, the adsorption separation or membrane can be performed at a temperature from about −195° C. to about 30° C., preferably from about −50° C. to about 30° C., and more preferably from about −30° C. to about 20° C. This can enhance the selectivity of the ITQ-55 for performing the separation, as well as potentially increasing the capacity of an adsorbent structure for holding oxygen. Optionally, performing a separation at low temperature can also benefit from allowing water to be condensed out of a fluid prior to the fluid being exposed to the adsorbent or membrane structure. Optionally, a low temperature separation can be performed at any convenient pressure, such as a pressure of from about 1 bar (~14.7 psi) to about 30 bar (~435 psi), preferably from about 1 bar (~14.7 psi) to about 25 bar (~363 psi), and more preferably from about 1 bar (~14.7 psi) to about 20 bar (~290 psi). It is noted that at these separation conditions, the fluid being separated can optionally correspond to a liquid.

As another option, the separation can be performed at a temperature of about −200° C. to about 50° C. and at a pressure of about 1 bar (~14.7 psi) to about 50 bar (~725 psi). Under these conditions, entry of argon can be reduced, minimized, or possibly eliminated. The minimized entry of argon into the adsorbent structure or membrane structure can facilitate performing a separation with high selectivity.

As still another option, the separation can be performed at a temperature greater than about −200° C., or greater than about −150° C., or greater than about −100° C., such as up to about 50° C. or more. Additionally or alternately, the separation can be performed at a pressure greater than about 1 bar (~14.7 psi), or greater than about 10 bar (~145 psi), or greater than about 20 bar (~290 psi), or more. Additionally or alternately, the separation can be performed at any combination of a temperature and pressure range cited in this paragraph. Under these conditions, some argon may be able to enter an adsorbent structure or membrane structure, but the separation can be performed with an oxygen selectivity as described above.

Illustrative $O_2$ adsorptive capacity can range from about 0.1 mol/kg to about 2 mol/kg, preferably from about 0.2 mol/kg to about 2 mol/kg, and more preferably from about 0.4 mol/kg to about 2 mol/kg.

Illustrative $O_2$ adsorption temperature can range from about −195° C. to about 30° C., preferably from about −50° C. to about 30° C., and more preferably from about −30° C. to about 20° C.

Illustrative $O_2$ desorption temperature can range from about 20° C. to about 100° C., preferably from about 25° C. to about 75° C., and more preferably from about 25° C. to about 50° C.

Illustrative $O_2$ adsorption pressure can range from about 1 bar (~14.7 psi) to about 30 bar (~435 psi), preferably from about 1 bar (~14.7 psi) to about 25 bar (~363 psi), and more preferably from about 1 bar (~14.7 psi) to about 10 bar (~145 psi).

Illustrative $O_2$ desorption pressure can range from about 0.1 bar (~1.5 psi) to about 10 bar (~145 psi), preferably from about 0.1 bar (~1.5 psi) to about 5 bar (~72.5 psi), and more preferably from about 0.1 bar (~1.5 psi) to about 1 bar (~14.5 psi).

Illustrative $O_2$ adsorption time can range from about 0.1 second to about 1000 seconds, preferably from about 1 seconds to about 500 seconds, and more preferably from about 1 seconds to about 100 seconds.

Illustrative $O_2$ desorption time can range from about 0.1 second to about 1000 seconds, preferably from about 1 seconds to about 500 seconds, and more preferably from about 1 seconds to about 100 seconds.

Illustrative $O_2$ content in the feed stream can range from about 2 wt. % to about 30 wt. %, preferably from about 2 wt. % to about 20 wt. %, and more preferably from about 2 wt. % to about 10 wt. %.

In an embodiment, using zeolite ITQ-55 in a PSA cycle with air feed, the PSA cycle time can range from about 1 second to about 3600 seconds, preferably from about 1 second to about 360 seconds, and more preferably from about 1 second to about 60 seconds.

Air Separations

Air refers to a gas mixture containing a combination of $N_2$, $O_2$, and argon. Water vapor and $CO_2$ can also be present in air. In some aspects it can be beneficial to separate one or more air components from air. For example, it can be desirable to separate $O_2$ from air so that the $O_2$ can be used and/or sequestered, or to separate $N_2$ from air so that the $N_2$ can be used and/or sequestered.

Oxygen can be separated from air (and optionally from other components present in air such as nitrogen) using an adsorbent and/or membrane that includes zeolite ITQ-55. Adsorption can be performed using any process of this disclosure, such as a swing adsorption process. For separation by adsorption, air can be exposed to an adsorbent structure. The surface of the adsorbent structure can be composed of and/or include zeolite ITQ-55 in a manner so that fluids that enter the adsorbent structure can enter by passing through pores of the ITQ-55.

During a separation process, a fluid comprising air can be exposed to an adsorbent or membrane structure. Based on the kinetic diameter and/or the affinity of oxygen for the ITQ-55, the oxygen can preferentially enter the adsorbent or membrane structure relative to other components of the air. This can allow for selectivity for oxygen over other air components, either for adsorption or for separation via membrane, of at least about 5, or at least about 10, or at least about 20, or at least about 30.

Similarly, for separation of oxygen using a membrane, air can be exposed to a membrane structure. The surface of the membrane structure can be composed of and/or include zeolite ITQ-55 in a manner so that fluids that enter the membrane structure can enter by passing through pores of the ITQ-55. Depending on the adsorbent structure, defects in the ITQ-55 crystal structure and/or defects between crystals can allow some fluids to enter the membrane structure without passing through the ITQ-55. Due to such defects, less than 100% of the fluids entering the membrane structure may pass through the ITQ-55 crystals, such as at least about 90 vol %, or at least about 95%, or at least about 98%.

During a separation process, a fluid comprising air can be exposed to an adsorbent or membrane structure. Based on the kinetic diameter and/or the affinity of oxygen for the ITQ-55 relative to other air components, oxygen can preferentially enter the adsorbent or membrane structure relative to other components of the air. This can allow for selectivity for oxygen over other air components, either for adsorption or for separation via membrane, of at least about 5, or at least about 10, or at least about 20, or at least about 30.

Optionally, the adsorption separation or membrane can be performed at a temperature from about −195° C. to about 30° C., preferably from about −50° C. to about 30° C., and more preferably from about −30° C. to about 20° C. This can enhance the selectivity of the ITQ-55 for performing the separation, as well as potentially increasing the capacity of an adsorbent structure for holding oxygen. Optionally, performing a separation at low temperature can also benefit from allowing water to be condensed out of a fluid prior to the fluid being exposed to the adsorbent or membrane structure. Optionally, a low temperature separation can be performed at any convenient pressure, such as a pressure of 50 bar (~725 psi) or less. It is noted that at these separation conditions, the fluid being separated can optionally correspond to a liquid.

As another option, the separation can be performed at a temperature of about −195° C. to about 30° C. and at a pressure from about 1 bar (~14.7 psi) to about 30 bar (~435 psi). Under these conditions, entry of nitrogen can be reduced, minimized, or possibly eliminated. The minimized entry of nitrogen into the adsorbent structure or membrane structure can facilitate performing a separation with high selectivity.

As still another option, the separation can be performed at a temperature greater than about −200° C., or greater than about −150° C., or greater than about −100° C., such as up to about 30° C. or more. Additionally or alternately, the separation can be performed at a pressure greater than about 1 bar (~14.7 psi), or greater than about 10 bar (~145 psi), or greater than about 20 bar (~290 psi), or greater than about 30 bar (~435 psi), such as up to about 50 bar (~725 psi) or more. Additionally or alternately, the separation can be performed at any combination of a temperature and pressure range cited in this paragraph. Under these conditions, some nitrogen may be able to enter an adsorbent structure or membrane structure, but the separation can be performed with an oxygen selectivity as described above.

As used herein, $O_2$ and oxygen are used interchangeably, $N_2$ and nitrogen are used interchangeably, and Ar and argon are used interchangeably.

The following non-limiting examples are provided to illustrate the disclosure.

EXAMPLES

The zeolite ITQ-55 used in this example is made up of zeolite crystal particles having a mean particle size within the range of approximately 2-30 microns. The ITQ-55 is a siliceous zeolite having a tortuous mono-directional small-pore system. The cavities are accessible through two parallel systems of zig-zag 8R channels (ring aperture: 5.9 Å by 2.1 Å). Adsorption and kinetic experiments show molecules larger than 3 Å can be adsorbed, indicating a flexible structure for ITQ-55. Scanning Electron Microscope (SEM) images of ITQ-55 are shown in FIG. 1.

Equilibrium Study

Figure 3:
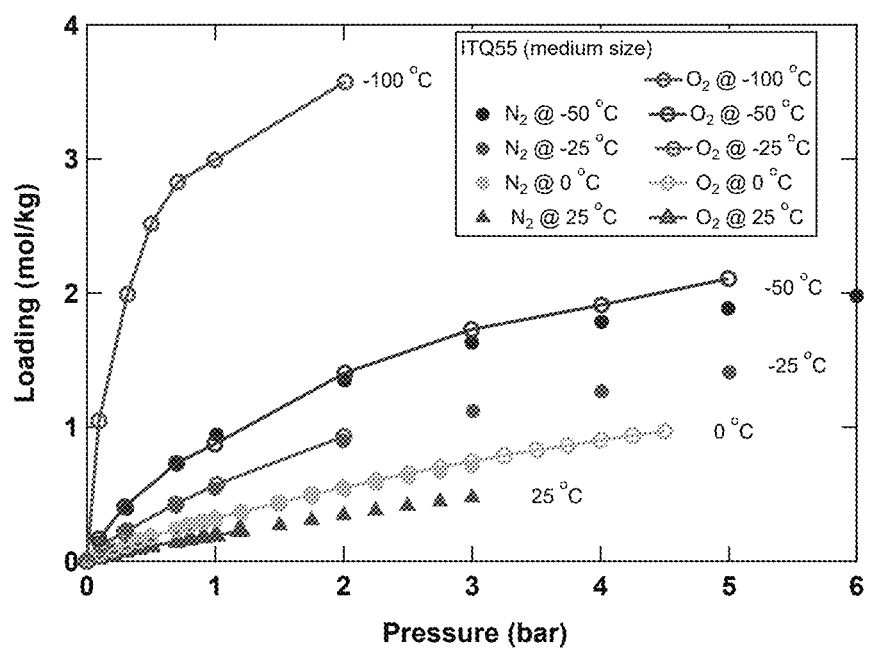
FIG. 3 shows a comparison of $N_2$ and $O_2$ adsorption on zeolite ITQ55, in accordance with the Examples.

Data for the equilibrium studies were measured on Hiden Isochema Intelligent Gravimetric Analyzer (IGA-002), a gravimetric unit using the microbalance with a resolution of 0.1 µg. The system can access low-temperature measurements down to −150° C. using cryofurnace with regulation accuracy ±0.05 to ±1° C. depending on operating temperature. The isotherm for $N_2$ was measured at −50, −25, 0, and 25° C. The capacity increased with decreasing temperature. The $N_2$ capacity of ITQ-55 at −50° C. is about 5 times compared to the capacity at 25° C. Even capacity at −25° C. is about two times the capacity at 25° C. A similar trend was observed for $O_2$ adsorption. Nitrogen and oxygen have a similar measured capacity for the temperature range studied. This demonstrates that the process is not equilibrium controlled in the selectivity between nitrogen and oxygen on ITQ-55. The nitrogen isotherm is shown in FIG. 2. The isotherm for nitrogen and oxygen is given in FIG. 3.

Kinetic Study

Like CMS, ITQ-55 provides the kinetic separation for $N_2/O_2$. Kinetic studies were first carried out using uptake measurements. Due to the limitation of uptake measurement for fast kinetics, $O_2$ kinetics could not be accurately extracted from the uptake measurement as the weight change following the pressure change was almost instantaneous. However, the $N_2$ uptake is much slower, taking hours to reach equilibrium depending on the temperature.

Figures 4, 5:
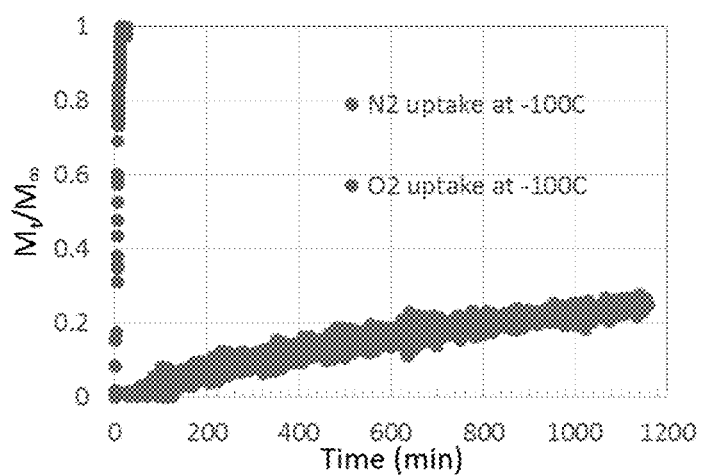
FIG. 4 shows kinetics extracted from uptake curves for $N_2$ and $O_2$, in accordance with the Examples.
FIG. 5 shows uptake rates of (from top down) $O_2$ and $N_2$ in zeolite ITQ-55 at −100° C., in accordance with the Examples.

The linear driving force equation (LDF) $Dq/dt=-k(c-c^*)$ was used for fitting observed pressure and weight changes. This data is given in FIG. 4. The rate constants k were extracted and listed in FIG. 4. Thus, the corresponding kinetic selectivity defined as the ratio of mass transfer rates of $N_2$ and $O_2$ was estimated through the experiments. The data clearly demonstrates that kinetic selectivity increases with decreasing temperature. The difference in uptake rates is illustrated in FIG. 5 for the mass transfer of $N_2$ and $O_2$ in ITA−55° C. at −100° C. $O_2$ equilibrium was reached within 10 minutes, but $N_2$ equilibrium was not reached after 1200 minutes, the maximum hold-time for experiments at −100° C. for this experiment. The estimated kinetic selectivity is over 700° C. at −100° C. Surprisingly the kinetic selectivity increased with a decrease in temperature.

An inherent problem with many kinetic PSA processes for the purification of crude $N_2$ or Ar utilizing either zeolite or CMS adsorbent is low recovery of the desired $N_2$ or Ar product due to low utilization of the full capacity of adsorbent. This arises because where feed step must be stopped well before adsorbent saturation to avoid contamination of the primary product with a high level of the impurity. An improvement in kinetic selectivity would enhance the bed utilization, and thus the final product recovery.

Since getting accurate $O_2$ kinetics from uptake measurement is difficult, and the controlling resistance for the mass transfer of $N_2$ and $O_2$ in ITQ-55 is not known, an advanced characterization—frequency response was used for this purpose.

Figure 6:
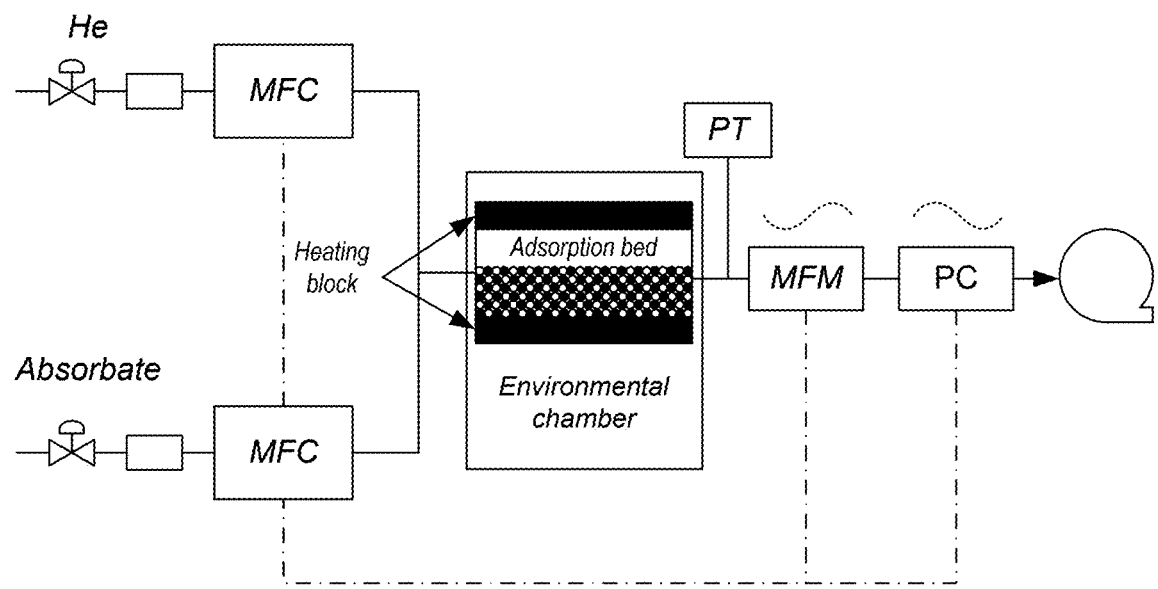
FIG. 6 shows a pressure-swing frequency response apparatus, in accordance with the Examples.

A pressure-swing frequency response apparatus was used to study mass transfer of $O_2$ and $N_2$ at 0° C., −25° C., −50° C. This instrument has unique capability to study a wide range of temperature (−70° C. to 150° C.), thus it is well suited for the mass transfer study at low temperatures. The sample was put into adsorption bed subjected to a periodic (typically sinusoidal) pressure perturbation of frequency and amplitude ΔP around the equilibrium state. The measured gas entered the system at a constant rate controlled by a mass flow controller and flowed through the adsorption bed, which was located in the environmental chamber, shown in FIG. 6. The flow rate into the system was maintained constant, and the flow rate out of the system responded in the periodic state with the same frequency but a different amplitude ΔF. The amplitude ratio (ΔF/ΔP) and phase shift of the response wave relative to the input were used to extract mass-transfer rates from models.

Figure 7:
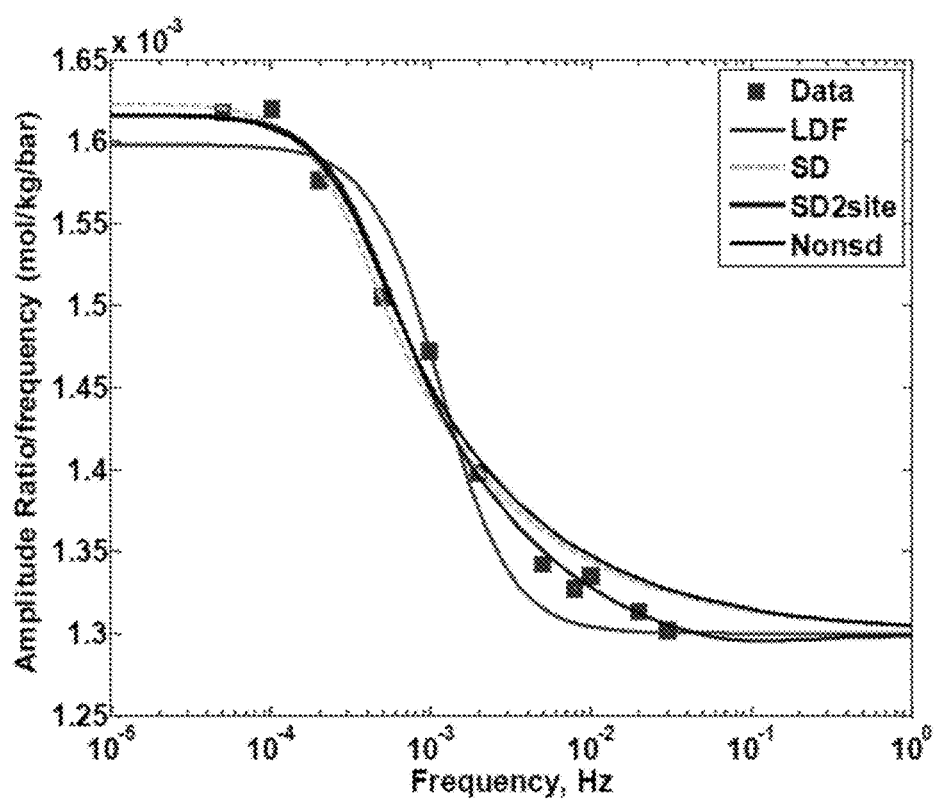
FIG. 7 shows amplitude ratio of frequency response results in ITQ-55 (medium size) for $N_2$ at 0° C., in accordance with the Examples.
Figure 8:
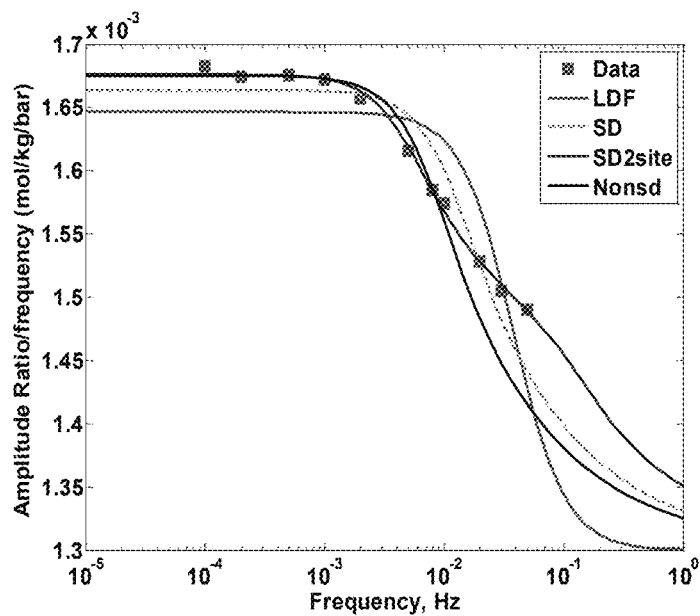
FIG. 8 shows amplitude ratio of frequency response results in ITQ-55 (medium size) for 02 at 0° C., in accordance with the Examples.

FIGS. 7 and 8 show the amplitude ratio curves of $N_2$ and $O_2$ in CMS at 0° C. The lines represent descriptions from different mass transfer mechanisms, with LDF for a surface barrier, SD for micropore diffusion, SD2 site for parallel diffusion with two sites, and Nonsd for nonisothermal micropore diffusion. The best description was from the parallel diffusion model, which indicated the dominating resistance was micropore diffusion. The parallel sites could come from the bimodal distribution of crystal sizes, resulting in two diffusion time constants $D/R^2$ that are related to crystal radius. The surface barrier was not the dominating resistance. This is different for CMS which shows dominance of a surface barrier for $N_2$.

Figure 9:
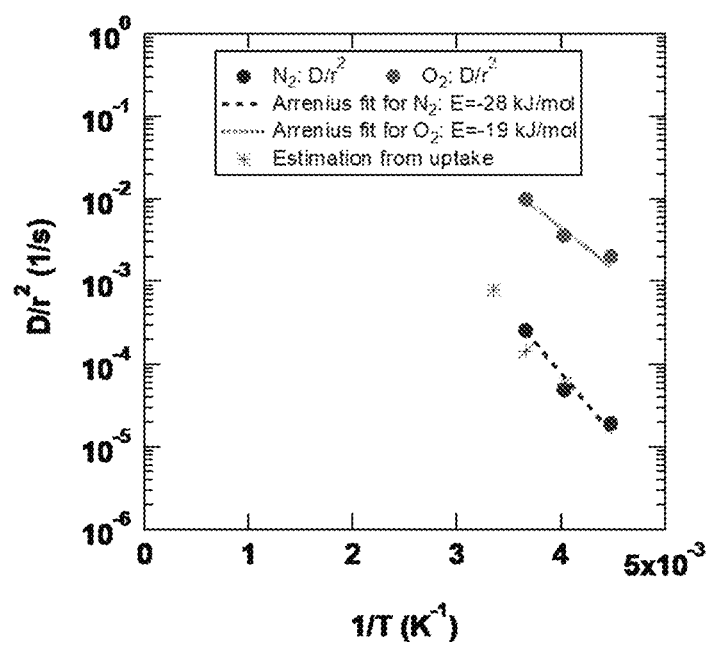
FIG. 9 shows diffusion time constants measured for $N_2$ and $O_2$ at various temperatures, in which the data was fitted with Arrhenius equation, in accordance with the Examples.

FIG. 9 shows the diffusivity dependence on temperature, with a semi-log plot of diffusion time constants vs. 1/T. The temperature dependence of diffusivity can be described by Arrhenius equation:

$$\frac{D_i}{r^2} = \frac{D_{0,i}}{r^2} e^{-\frac{\Delta E_{D,i}}{RT}} \quad (1)$$

Figure 10:
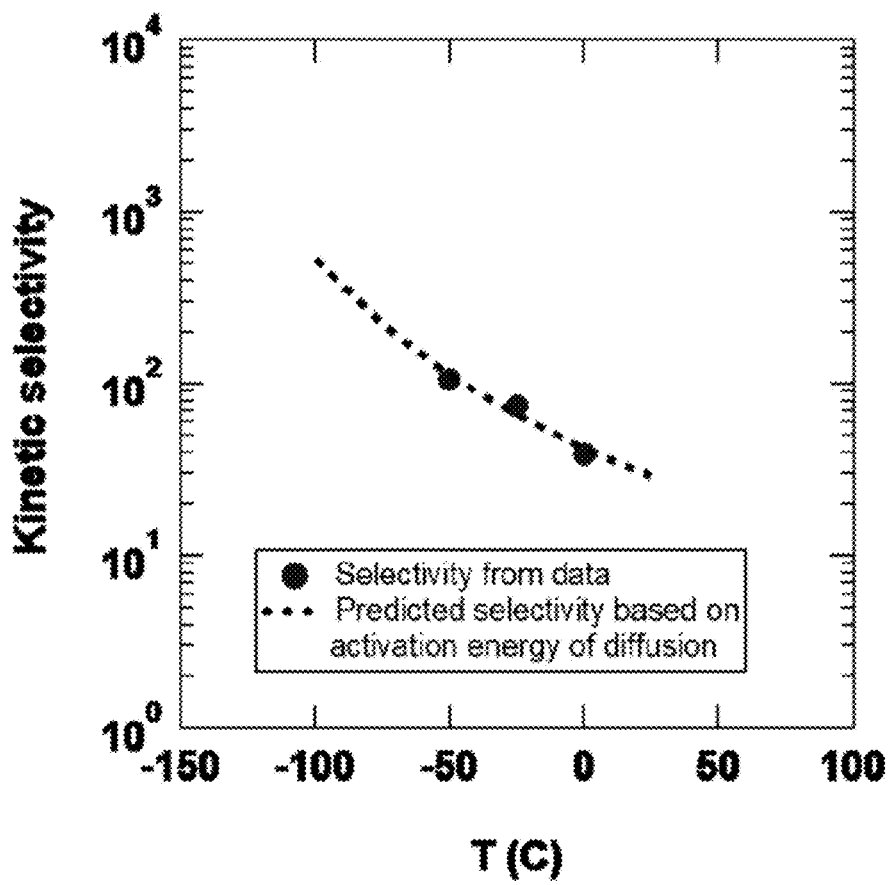
FIG. 10 shows kinetic selectivity for $O_2/N_2$ separation in zeolite ITQ-55, in accordance with the Examples.

The activation energy $E_D$ for diffusion was determined to be 28 kJ/mol for $N_2$ and 19 kJ/mol for $O_2$. It is evident that the diffusivity for $N_2$ decreased with temperature more rapidly than $O_2$. Therefore, the kinetic selectivity increased with decreasing temperature, shown in FIG. 10. The kinetic selectivity (ratio of diffusion time constants) was calculated from the diffusivity ratio of $O_2$ and $N_2$. The selectivity was about 100 at −50° C., and about 65 at −25° C. From the prediction based on diffusion energy, the selectivity was estimated to be 530 at −100° C. This value agrees reasonably with the uptake measurement, which estimated the kinetic selectivity ~700.

Mixture Breakthrough Experiment ($N_2/O_2$ and $O_2/Ar$)

Figure 11:
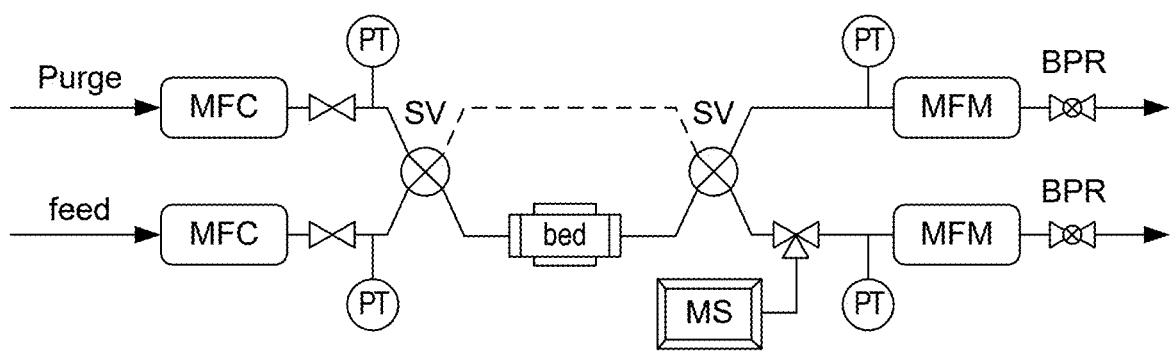
FIG. 11 shows gas breakthrough setup to monitor binary $N_2/O_2$ separation with various ITQ-55 crystals and consists of mass flow controllers (MFC), pressure transducers (PT), gas switching valves (SV), bed with ITQ-55 crystals under investigation, outlet gas compositions analysis with mass spectrometer (MS), mass flow meters (MFM), and back pressure regulators (BPR).
Figure 12:
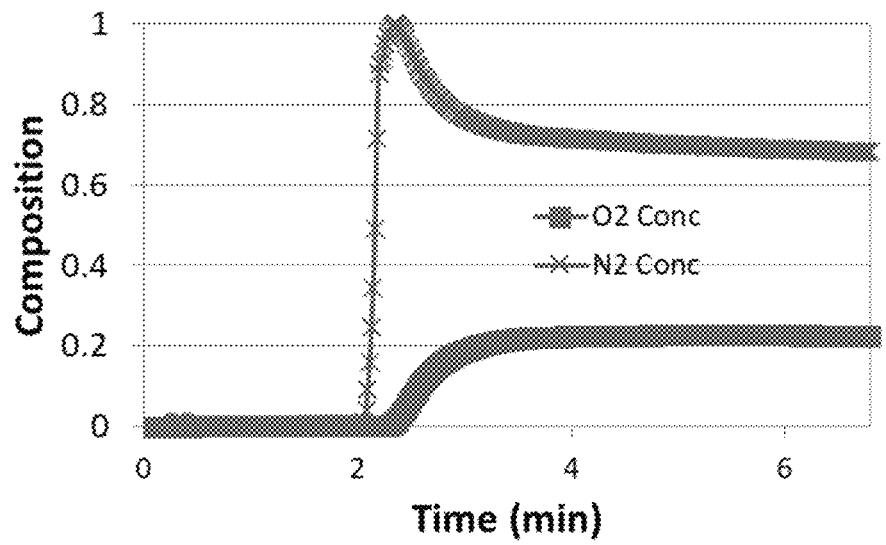
FIG. 12 shows breakthrough experiments for $N_2/O_2$, in accordance with the Examples. An adsorption bed was packed with 713 mg ITQ-55 (medium size) at 0° C. for feed mixture containing 70:30 $N_2:O_2$ at 1.05 bar (~15.2 psi) flowing at 2 sccm.

The concept of air separation of ITQ-55 was confirmed with mixture breakthrough experiments for both $N_2/O_2$ and $O_2/Ar$ using experimental setup shown by FIG. 11. FIG. 12 demonstrates the kinetics separation of $N_2$ (70%) and $O_2$ (30%) at 0° C. and 800 torr. The adsorption bed contained about 0.7 g sample with intermediate size ITQ-55 shown in FIG. 1. Due to slow kinetics of $N_2$ compared to $O_2$, $N_2$ could not be adsorbed and exhibited breakthrough first. $O_2$ diffused fast and was adsorbed in the bed. Then $O_2$ exhibited breakthrough once the full capacity reached in the bed of small quantity of sample.

Figure 13:
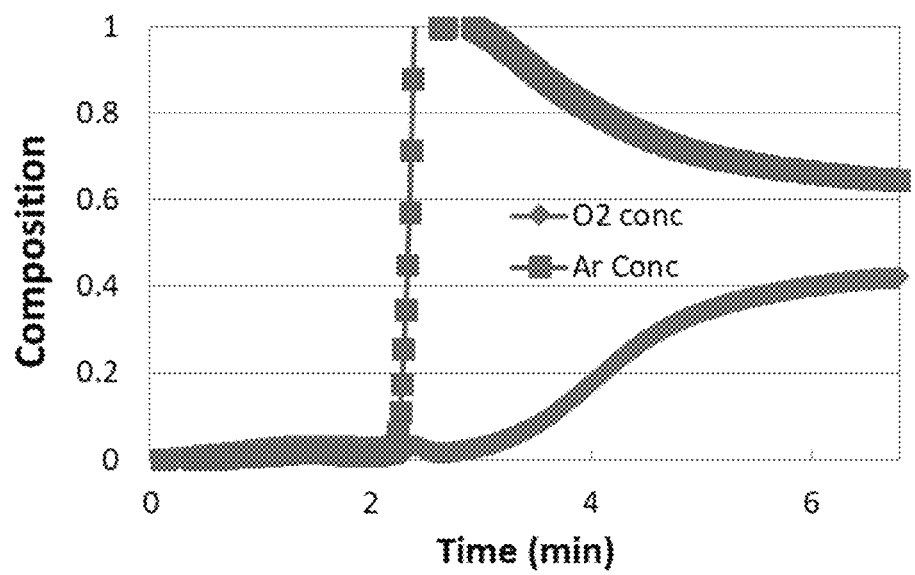
FIG. 13 shows breakthrough experiments for $Ar/O_2$, in accordance with the Examples. An adsorption bed was packed with 713 mg ITQ-55 (medium size) at −40° C. for feed mixture containing 50:50 $Ar:O_2$ at 1.05 bar (~15.2 psi) flowing at 2 sccm.

The experiment for 50:50 $O_2$:Ar at −40° C. was carried out with the same bed. As shown in FIG. 13, Ar diffused more slowly than $O_2$ to let Ar breakthrough first then followed by $O_2$.

Air separation experiments with large crystal of ITQ-55 of about 60 um (see FIG. 14) were also conducted. The sample was made by fluoride synthesis with lower fraction of structure defects. $^{29}$Si NMR detected approximately 5% of Q3 Si atoms.

Figure 15:
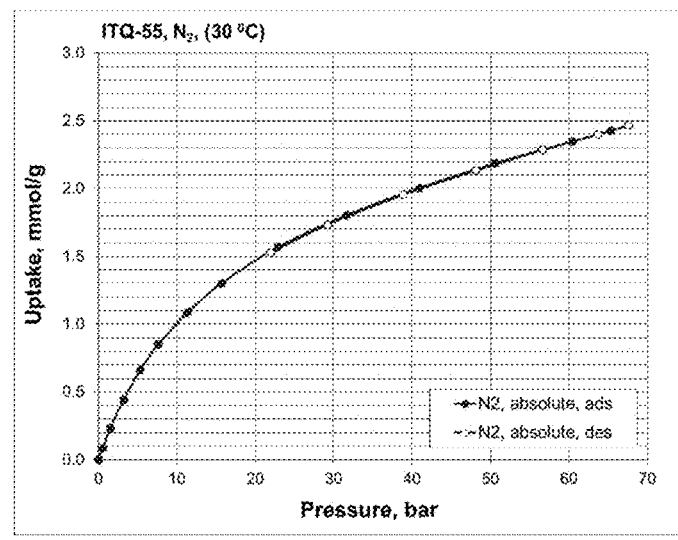
FIG. 15 shows an adsorption isotherm of $N_2$ on zeolite crystal ITQ55 having a mean crystal size distribution of about 60 microns and measured at 30° C., in accordance with the Examples.
Figure 16:
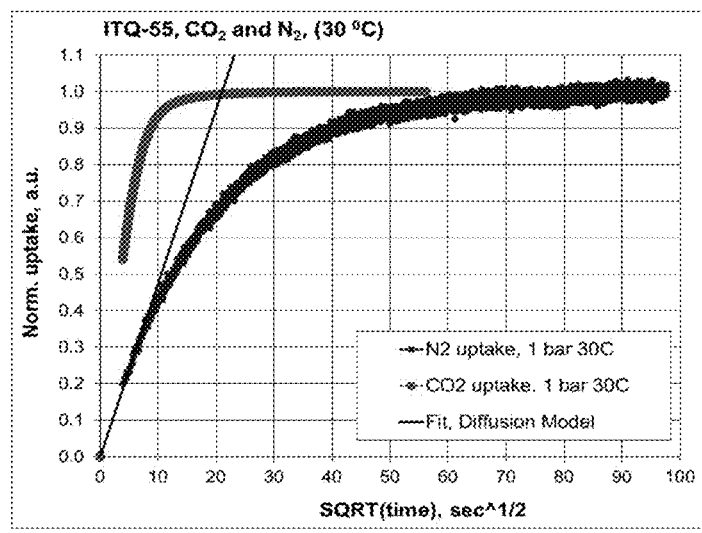
FIG. 16 shows an adsorption isotherm of $N_2$ and $CO_2$ on zeolite crystal ITQ55 having a mean crystal size distribution of about 60 microns, on $N_2$ uptake at 1 bar (~14.7 psi) measured at 30° C., in accordance with the Examples.

The nitrogen adsorption isotherm on large crystal ITQ-55 is shown on FIG. 15. While nitrogen capacity was moderate, nitrogen adsorption kinetic was slow. Kinetic time constant $D/R^2$ for $N_2$ at 30° C. is $4.4 \times 10^{-4}$ 1/s as analyzed from uptake curves at 1 bar (~14.7 psi) at 30° C. FIG. 16 shows $CO_2$ and $N_2$ uptake. Diffusion rate of $CO_2$ is $1.3 \times 10^{-3}$ 1/s, approximately the low limit of $O_2$ diffusion as oxygen molecule is smaller than carbon dioxide and $O_2$ is expected to diffuse faster than $CO_2$.

Figure 17:
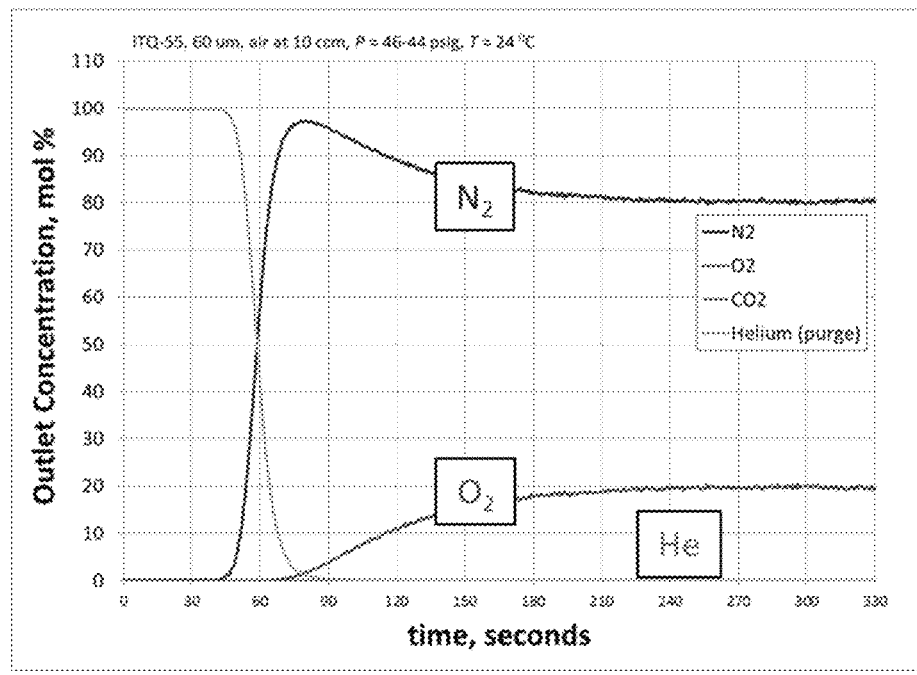
FIG. 17 shows air breakthrough experiments using crystal zeolite ITQ55 having a mean crystal size distribution of about 60 microns, at 4.1 bar (~59.5 psi) at 24° C., in accordance with the Examples.
Figure 18:
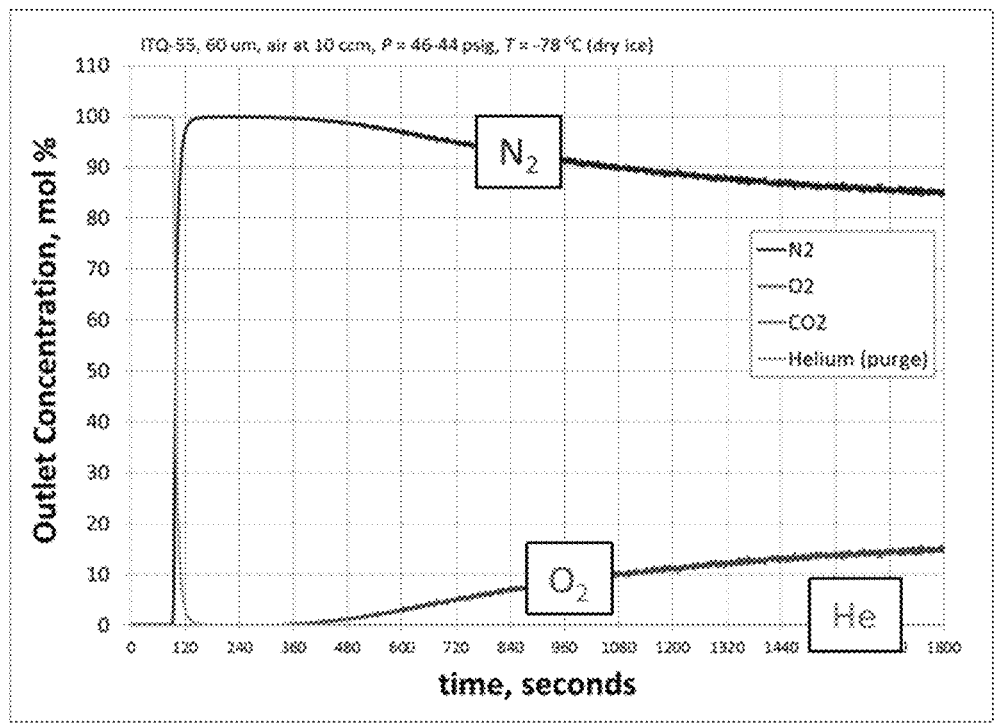
FIG. 18 shows air breakthrough experiments using crystal zeolite ITQ55 having a mean crystal size distribution of about 60 microns, at 4.1 bar (~59.5 psi) at −78° C., in accordance with the Examples.

A series of oxygen/nitrogen separation experiments from compressed air with approximately 80 mol % $N_2$ and 19.5 mol % $O_2$ at 4.1 bar (~59.5 psi) with large crystal ITQ-55 (see FIG. 14) using gas breakthrough setup (see FIG. 11) were conducted. FIG. 17 shows outlet gas concentration of ITQ-55 column and concentration of nitrogen enriches to approximately 97 mol % due to kinetically selective adsorption of oxygen even at ambient temperature. Lower temperature increased $O_2/N_2$ kinetic selectivity and increased adsorption capacity of oxygen that leads to purification of nitrogen to 100 mol % during complete oxygen adsorption on ITQ-55 (see FIG. 18). These experiments demonstrate the potential of ITQ-55 to capture oxygen from air at ambient temperature and below ambient temperature.

Figure 19:
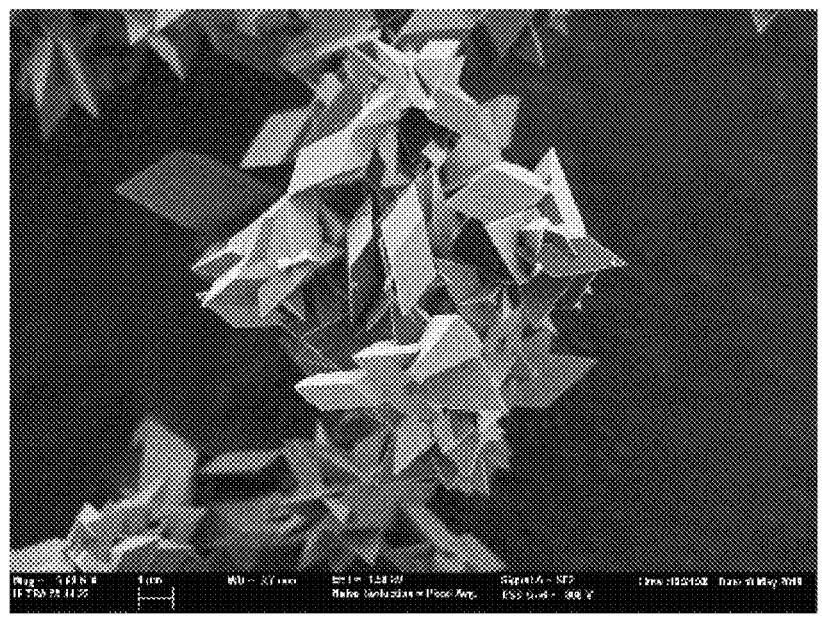
FIG. 19 shows scanning electron microscope (SEM) images of zeolite LTQ-55 (small size) having a mean crystal size distribution of about 1 micron.
Figure 20:
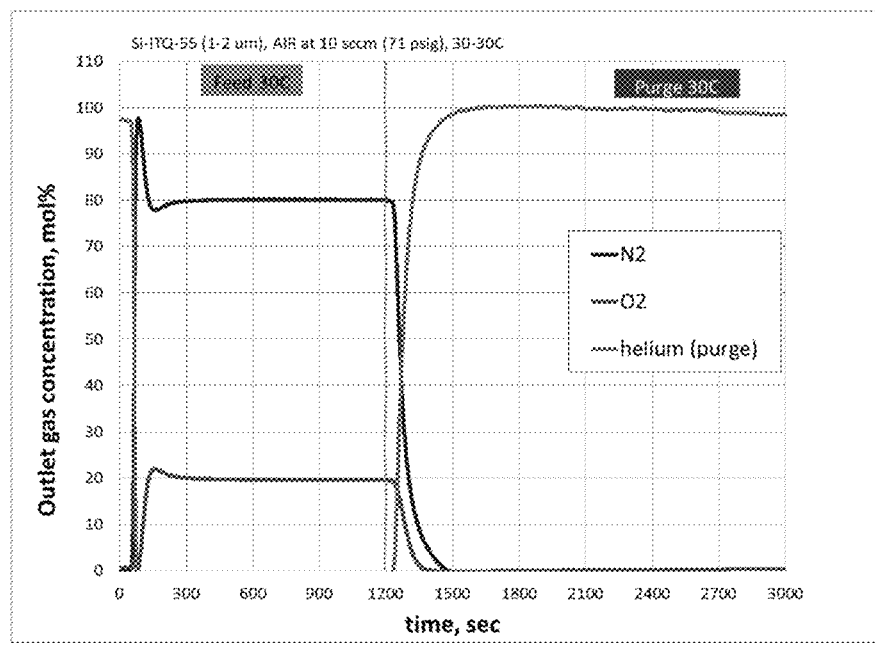
FIG. 20 shows air breakthrough experiments using crystal zeolite ITQ55 (small size) having a mean crystal size distribution of about 1 micron, at 5.8 bar (~84.1 psi) at 30° C., in accordance with the Examples.
Figure 21:
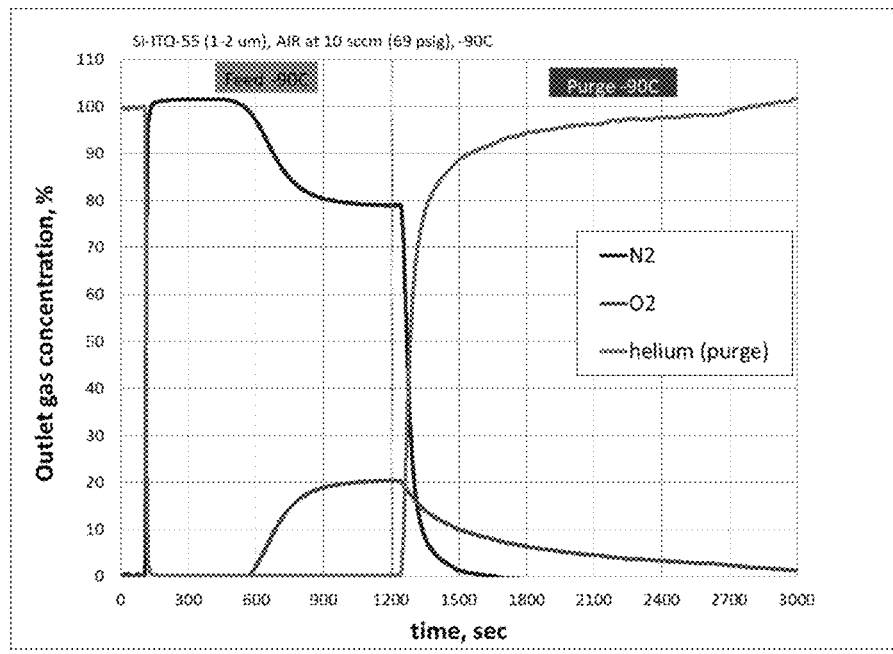
FIG. 21 shows air breakthrough experiments using crystal zeolite ITQ55 (small size) having a mean crystal size distribution of about 1 micron, at 5.8 bar (~84.1 psi) at −90° C., in accordance with the Examples.

Yet another series of oxygen/nitrogen separation experiments from compressed air with approximately 80 mol % $N_2$ and 19.5 mol % $O_2$ at 5.8 bar (~84.1 psi) with small crystal ITQ-55 (see FIG. 19) using gas breakthrough setup (FIG. 11) were conducted. FIG. 20 shows outlet gas concentration of ITQ-55 column and concentration of nitrogen enriches to approximately 97 mol % due to kinetically selective adsorption of oxygen even at 30° C. Lower temperature increased $O_2/N_2$ kinetic selectivity and increased adsorption capacity of oxygen that leads to purification of nitrogen to 100 mol % for extended period of time during complete oxygen adsorption on ITQ-55 (see FIG. 21). These experiments demonstrate the potential of ITQ-55 to capture oxygen from air at ambient temperature and below ambient temperature.

Process Simulation

Figure 22:
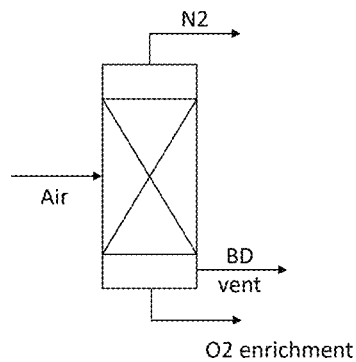
FIG. 22 depicts a pressure swing adsorption (PSA) setup, showing parallel producing $N_2$ on top and $O_2$ enrichment on bottom, in accordance with the Examples.

These examples demonstrate novel process for $O_2$ enrichment based on ITQ-55. The approach can be applied to other kinetics adsorbent, such as CMS. With the flexibility of operation in pressure, temperature, and cycle time, various $O_2$ concentration can be achieved in desorption stream while relatively pure $N_2$ can be produced as product. The concept of harvesting enriched $O_2$ stream from desorption and/or partially blowdown steams, shown in FIG. 22.

An $O_2$ enrichment simulation was conducted to establish process development.

Incorporating 2-Bed 6 Step Skarstrom Cycle

Figure 23:
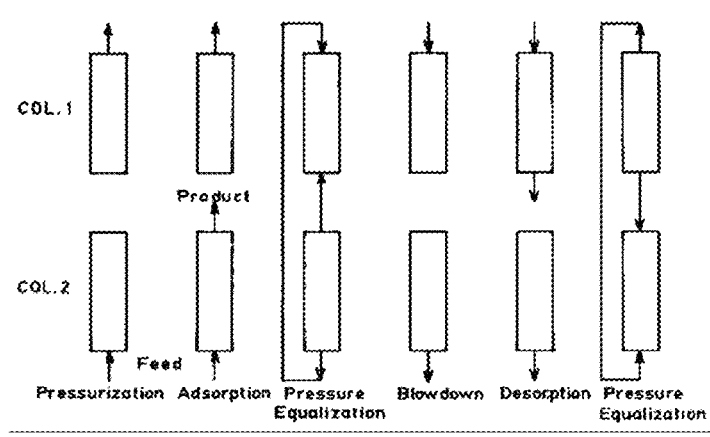
FIG. 23 shows a 2-bed 6-step modified Skarstrom cycle, in accordance with the Examples.

Incorporating 2-bed 6 step Skarstrom cycle shown in FIG. 23, process simulation was run on an adsorption bed of 0.35 m (long)×0.035 m (diameter) with different feed flowrate from 1 to 3.5 (SLPM). Due to kinetic effects there was a considerable amount of gas leaving the bed to the purge vent during the desorption step within the PSA cycle. The definition of $N_2$ and $O_2$ recovery is $$N_2 \text{ recovery} = \frac{\text{moles of } N_2 \text{ in product during } t_{AD}}{\text{moles of } N_2 \text{ in feed during } t_{AD} + t_{PR}}$$

Figure 24:
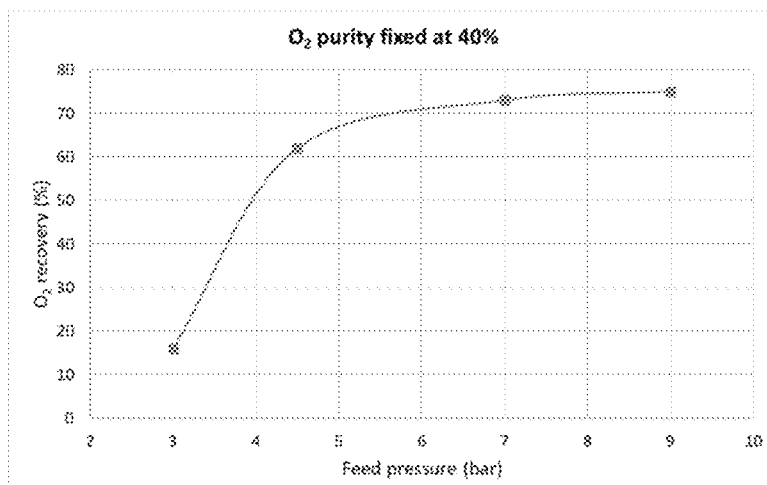
FIG. 24 shows $O_2$ recovery as a function of feed pressure, in accordance with the Examples.

To fix ~40% $O_2$ purity in the $O_2$ enrichment product, the simulation showed high pressure in adsorption step increased the $O_2$ recovery. Higher recovery over 70% was achieved in the simulation results. FIG. 24 shows $O_2$ recovery as a function of feed pressure.

Furthermore, by changing cycles with equalization step performed only from the tops of columns and reduce blow down and pressurization times, the $O_2$ recovery was further increased by 14%. With flowrate of 1.68 SLPM, $O_2$ purity in the off gas was 40% with an $O_2$ recovery of 76.3%, compared to the traditional cycle with 63% recovery for the 40% $O_2$ in the off gas using CMS.

Figures 25, 26:
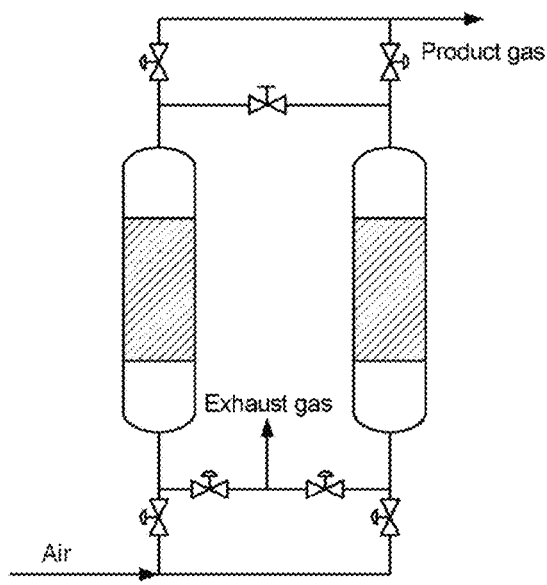
FIG. 25 shows $O_2$ recovery and $N_2$ purity as a function of vacuum pressure, in accordance with the Examples. With increasing vacuum, the $O_2$ recovery and $N_2$ purity improve.
FIG. 26 shows a schematic diagram of a two-bed pressure swing adsorption (PSA) or vacuum pressure swing adsorption (VPSA) process, in accordance with the Examples.

To increase separation performance with incorporation of vacuum for desorption step, the simulation showed that $O_2$ recovery was over 90% with vacuum, while $N_2$ purity in product was over 95%, shown in FIG. 25 for a fixed $O_2$ enriched to 40%. Higher vacuum provides higher $O_2$ recovery and higher $N_2$ purity.

VPSA Process to Produce 40 vol % O$_2$/60 vol % N$_2$ from Air

A two-bed vacuum pressure temperature swing adsorption (VPSA) process (schematic diagram shown in FIG. 26) was used to separate air. During adsorption step, nitrogen molecule diffuses into the solid particle more slowly and breaks through the adsorption bed faster than oxygen molecule. Most of oxygen was captured by the packed bed. In order to achieve high oxygen recovery, vacuum was applied to evacuate the gases in the bed void and those adsorbed by the adsorbents. The single adsorption bed has a dimension of 1.5 meter (diameter)×2 meter (length) with bed voidage 0.4. VPSA cycle consisting of six operating steps is described in FIGS. 27 and 28.

Cycle step is detailed in FIG. 28. Pressure equivalization between two beds was performed from the bed top. The enriched gas phase nitrogen from one bed end section after AD step was introduced to the other bed end after DE step. This is critical to produce high purity nitrogen with improved recovery for both oxygen and nitrogen.

Figures 29, 30:
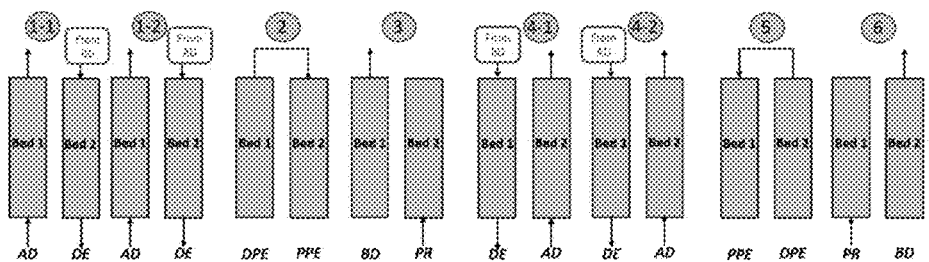
FIG. 29 shows a comparison of separation performances for ITQ-55 and carbon molecular sieves (CMS) including purity, recovery and productivity, in accordance with the Examples.
FIG. 30 shows a 6-step pressure swing adsorption (PSA) cycle, in accordance with the Examples.

The separation performances are compared in FIG. 29 for ITQ-55 and CMS.

PSA Process to Produce 30 vol % O$_2$/70 vol % N$_2$ from Air

In previous process, high vacuum had to be applied to produce oxygen of 40% purity and 97.64% recovery for both EM and CMS adsorbents. In this example, the objective was to obtain lower oxygen concentration, i.e., 30% purity. One quick solution is that 40% oxygen from the example above can be diluted to 30% purity using air and those blowdown vent gases. However, this does not seem to be an economic way as it does not get rid of the costly vacuum pump and oxygen recovery will become lower with the consumption of more air. Since it is relatively easy to produce gas with 30% oxygen purity, a better solution is not to use the vacuum pump. The blowdown effluent gases were recovered and used in the first stage of purge followed by the second stage of purge using a ratio of raffinate product. The second stage of purge is essential to produce high nitrogen purity in the raffinate product. This leads to the less loss of oxygen in the adsorption and blowdown steps and thus higher oxygen recovery. The 6-step PSA cycle and operating sequence of the two-bed pressure swing adsorption (PSA) process for production of 30 vol % O$_2$/70 vol % N$_2$ are presented in FIGS. 30 and 31, respectively.

Example cycle time used for the 6-step PSA was 45 seconds. The main difference between this PSA and VPSA was the DE step. For PSA in this example, DE step was performed under atmospheric pressure. The bed was counter-currently purged using the blowdown effluent gases for 10 seconds followed by additional 10 seconds of purge using a ratio of adsorption effluent gases. The separation performances are compared in FIG. 32.

PCT and EP Clauses:

1. A process of adsorbing oxygen from a feed stream containing oxygen and nitrogen, comprising passing the feed stream through a bed of an adsorbent comprising zeolite ITQ-55 to adsorb oxygen from the feed stream, thereby producing a product stream depleted in oxygen; wherein the zeolite ITQ-55 has a mean crystal particle size within the range of from about 0.1 microns to about 40 microns; wherein the feed stream is exposed to the zeolite ITQ-55 at effective conditions for performing a kinetic separation, in which the kinetic separation exhibits greater kinetic selectivity for oxygen than for nitrogen.

2. The process of clause 1, which is a swing adsorption process comprising an adsorption step performed at elevated pressure and/or reduced temperature in which the feed stream is passed through a bed of adsorbent comprising the zeolite ITQ-55 to adsorb oxygen from the feed stream, and a desorption step performed at reduced pressure and/or elevated temperature in which oxygen from the previous adsorption step is desorbed from the bed to regenerate the bed for the next adsorption step.

3. The process of clauses 1 and 2, which is a rapid swing adsorption process, wherein the rapid swing adsorption process is selected from rapid cycle thermal swing adsorption (RCTSA), rapid cycle pressure swing adsorption (RCPSA), and rapid cycle vacuum pressure swing adsorption (RCVPSA), or combinations of these processes.

4. The process of clauses 1-3, wherein the bed of adsorbent is configured as a monolith having a plurality of parallel channels.

5. The process of clauses 1-4, wherein the kinetic separation exhibits greater kinetic selectivity for oxygen than for nitrogen, at a temperature from about −195° C. to about 30° C., and at a pressure of about 1 bar (~14.7 psi) to about 30 bar (~435 psi).

6. The process of clauses 1-5, wherein the zeolite ITQ-55 has a mean crystal particle size within the range of from about 0.5 microns to about 10 microns, or a mean crystal particle size within the range of from about 1 microns to about 5 microns.

7. The process of clauses 1-6, which is a swing adsorption process comprising a feed step, one or more down equalization steps, a co-current or counter-current blow down and depressurization, one or more up equalization steps, and feed repressurization to achieve coproduction of high purity nitrogen having a concentration >97% and enriched oxygen having a concentration >25%.

8. The process of clauses 1-7, wherein the feed stream comprises air including humid air and dry air, an oxygen-containing stream, a stream containing oxygen and nitrogen, or a stream containing oxygen and argon.

9. The process of clauses 1-8, further comprising collecting the desorbed oxygen as an oxygen-enriched stream compared to the feed stream, collecting the unadsorbed N$_2$ as a nitrogen-enriched stream compared to the feed stream, and/or collecting the unadsorbed argon as an argon-enriched stream compared to the feed stream.

10. The process of clauses 1-9, wherein the oxygen-enriched stream is used in a cryogenic air separation unit (ASU), a fluid catalytic cracking (FCC) unit, a natural gas combined cycle (NGCC) unit, a steam methane reformer (SMR) unit, or any combustion or gasification not limited to natural gas, coal, or bio-mass.

11. The process of clauses 1-10, wherein the swing adsorption process is pressure swing adsorption (PSA) which is configured into a cryogenic air separation unit (ASU), wherein the configuration is a PSA+ASU hybrid configuration in which the PSA pre-concentrates oxygen by rejection of at least a part of nitrogen, or an ASU+PSA hybrid configuration in which the PSA is installed in an O$_2$-rich stream after a high pressure (HP) section of the ASU purifies a part of O$_2$.

12. The process of clauses 1-11, wherein oxygen purity is greater than about 25%; and/or wherein nitrogen purity is greater than about 90%.

13. The process of clauses 1-12, further comprising tuning kinetic selectivity and mass transfer rates by varying the mean crystal particle size of zeolite ITQ-55 within the range of from about 0.1 microns to about 40 microns, or by varying the adsorption temperature within the range from about −195° C. to about 30° C., or by varying the adsorption pressure within the range from about 1 bar (~14.7 psi) to about 30 bar (~435 psi), or combinations thereof.

14. A process of adsorbing oxygen from a feed stream containing oxygen, nitrogen and argon, comprising passing the feed stream through a bed of an adsorbent comprising zeolite ITQ-55 to adsorb oxygen from the feed stream, thereby producing a product stream depleted in oxygen; wherein the zeolite ITQ-55 has a mean crystal particle size within the range of from about 0.1 microns to about 40 microns; wherein the feed stream is exposed to the zeolite ITQ-55 at effective conditions for performing a kinetic separation, in which the kinetic separation exhibits greater kinetic selectivity for oxygen than for nitrogen and argon.

15. A process of adsorbing oxygen from a feed stream comprising oxygen, nitrogen, and water, comprising passing the feed stream through one or more beds of adsorbent comprising a first adsorbent selective for water so as to adsorb water from the feed stream and a second adsorbent selective for oxygen so as to adsorb oxygen from the feed stream, thereby producing a rejection product stream enriched in nitrogen and depleted in oxygen and water, wherein the first bed comprises a dehydration adsorbent and the second bed comprise ITQ-55; wherein the zeolite ITQ-55 has a mean crystal particle size within the range of from about 0.1 microns to about 40 microns; wherein the feed stream is exposed to the first adsorbent at effective conditions to remove water from the feed stream; and wherein the feed stream is exposed to the second adsorbent at effective conditions for performing a kinetic separation, in which the kinetic separation exhibits greater kinetic selectivity for oxygen than for nitrogen.

All patents and patent applications, test procedures (such as ASTM methods, UL methods, and the like), and other documents cited herein are fully incorporated by reference to the extent such disclosure is not inconsistent with this disclosure and for all jurisdictions in which such incorporation is permitted.

When numerical lower limits and numerical upper limits are listed herein, ranges from any lower limit to any upper limit are contemplated. While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains.

The present disclosure has been described above with reference to numerous embodiments and specific examples. Many variations will suggest themselves to those skilled in this art in light of the above detailed description. All such obvious variations are within the full intended scope of the appended claims.

What is claimed is:

1. A process of adsorbing oxygen from a feed stream comprising oxygen, nitrogen, and water, comprising passing the feed stream through one or more beds of adsorbent comprising a first adsorbent selective for water so as to adsorb water from the feed stream and a second adsorbent selective for oxygen so as to adsorb oxygen from the feed stream, thereby producing a rejection product stream enriched in nitrogen and depleted in oxygen and water, wherein the first adsorbent comprises a dehydration adsorbent and the second adsorbent comprise ITQ-55; wherein the zeolite ITQ-55 has a mean crystal particle size within the range of from about 0.1 microns to about 40 microns; wherein the feed stream is exposed to the first adsorbent at effective conditions to remove water from the feed stream; and wherein the feed stream is exposed to the second adsorbent at effective conditions for performing a kinetic separation, in which the kinetic separation exhibits greater kinetic selectivity for oxygen than for nitrogen.

2. The process of claim 1, which is a swing adsorption process comprising an adsorption step performed at elevated pressure and/or reduced temperature in which the feed stream is passed through a bed of adsorbent comprising the zeolite ITQ-55 to adsorb oxygen from the feed stream, and a desorption step performed at reduced pressure and/or elevated temperature in which oxygen from the previous adsorption step is desorbed from the bed to regenerate the bed for the next adsorption step.

3. The process of claim 1 further comprising tuning kinetic selectivity and mass transfer rates by varying the mean crystal particle size of zeolite ITQ-55 within the range of from about 0.1 microns to about 40 microns, or by varying the adsorption temperature within the range from about −195° C. to about 30° C., or by varying the adsorption pressure within the range from about 1 bar (~14.7 psi) to about 30 bar (~435 psi), or combinations thereof.

4. The process of claim 2, which is a rapid swing adsorption process, wherein the rapid swing adsorption process is selected from rapid cycle thermal swing adsorption (RCTSA), rapid cycle pressure swing adsorption (RCPSA), and rapid cycle vacuum pressure swing adsorption (RCVPSA), or combinations of these processes.

5. The process of claim 2, further comprising collecting the desorbed oxygen as an oxygen-enriched stream compared to the feed stream.

6. The process of claim 1, further comprising collecting unadsorbed $N_2$ as a nitrogen-enriched stream compared to the feed stream.

7. The process of claim 5, wherein the oxygen-enriched stream is used in a cryogenic air separation unit (ASU), a fluid catalytic cracking (FCC) unit, a natural gas combined cycle (NGCC) unit, a steam methane reformer (SMR) unit, or any combustion or gasification not limited to natural gas, coal, or bio-mass.

8. The process of claim 2, wherein oxygen purity for oxygen desorbed from the bed is greater than about 25%; and/or wherein nitrogen purity for the product stream depleted in oxygen is greater than about 90%.

9. A process of adsorbing oxygen from a feed stream containing oxygen and nitrogen, comprising passing the feed stream through a bed of an adsorbent comprising zeolite ITQ-55 to adsorb oxygen from the feed stream, thereby producing a product stream depleted in oxygen; wherein the zeolite ITQ-55 has a mean crystal particle size within the range of from about 0.1 microns to about 40 microns; wherein the feed stream is exposed to the zeolite ITQ-55 at effective conditions for performing a kinetic separation, in which the kinetic separation exhibits greater kinetic selectivity for oxygen than for nitrogen, wherein the process is a swing adsorption process comprising an adsorption step performed at elevated pressure and/or reduced temperature in which the feed stream is passed through a bed of adsorbent comprising the zeolite ITQ-55 to adsorb oxygen from the feed stream, and a desorption step performed at reduced pressure and/or elevated temperature in which oxygen from the previous adsorption step is desorbed from the bed to regenerate the bed for the next adsorption step, and wherein the swing adsorption process is pressure swing adsorption (PSA) which is configured into a cryogenic air separation unit (ASU), wherein the configuration is a PSA+ASU hybrid configuration in which the PSA pre-concentrates oxygen by rejection of at least a part of nitrogen, or an ASU+PSA hybrid configuration in which the PSA is installed in an $O_2$-rich stream after a high pressure (HP) section of the ASU purifies a part of $O_2$.

10. The process of claim 9, wherein the bed of adsorbent is configured as a monolith having a plurality of parallel channels.

11. The process of claim 9, wherein the kinetic separation exhibits greater kinetic selectivity for oxygen than for nitrogen, at a temperature from about −195° C. to about 30° C., and at a pressure of about 1 bar (~14.7 psi) to about 30 bar (~435 psi).

12. The process of claim 9, wherein the zeolite ITQ-55 has a mean crystal particle size within the range of from about 0.5 microns to about 10 microns, or a mean crystal particle size within the range of from about 1 microns to about 5 microns.

13. The process of claim 9, which is a swing adsorption process comprising a feed step, one or more down equalization steps, a co-current or counter-current blow down and depressurization, one or more up equalization steps, and feed repressurization to achieve coproduction of high purity nitrogen having a concentration >97% and enriched oxygen having a concentration >25%.

14. The process of claim 9 further comprising tuning kinetic selectivity and mass transfer rates by varying the mean crystal particle size of zeolite ITQ-55 within the range of from about 0.1 microns to about 40 microns, or by varying the adsorption temperature within the range from about −195° C. to about 30° C., or by varying the adsorption pressure within the range from about 1 bar (~14.7 psi) to about 30 bar (~435 psi), or combinations thereof.

* * * * *